United States Patent
Okubo et al.

(10) Patent No.: US 7,937,084 B2
(45) Date of Patent: May 3, 2011

(54) COMMUNICATION NETWORK SYSTEM AND MOBILE TERMINAL

(75) Inventors: Akira Okubo, Tokyo (JP); Masahiro Kuroda, Tokyo (JP)

(73) Assignees: Mitsubishi Electric Corporation, Tokyo (JP); National Institute of Information & Communication Technology, Tokyo (JP)

( * ) Notice: Subject to any disclaimer, the term of this patent is extended or adjusted under 35 U.S.C. 154(b) by 901 days.

(21) Appl. No.: 11/886,250

(22) PCT Filed: Mar. 14, 2005

(86) PCT No.: PCT/JP2005/004457
§ 371 (c)(1),
(2), (4) Date: Sep. 13, 2007

(87) PCT Pub. No.: WO2006/097987
PCT Pub. Date: Sep. 21, 2006

(65) Prior Publication Data
US 2009/0124255 A1    May 14, 2009

(51) Int. Cl.
*H04W 4/00* (2009.01)
*H04M 11/00* (2006.01)

(52) U.S. Cl. .............. 455/433; 455/435.2; 455/403

(58) Field of Classification Search ............. 455/426.1, 455/456; 370/350, 467; 709/220, 242; 707/715
See application file for complete search history.

(56) References Cited

U.S. PATENT DOCUMENTS

| | | | | |
|---|---|---|---|---|
| 6,363,255 B1 * | 3/2002 | Kuwahara | ............. | 455/456.5 |
| 6,771,958 B1 * | 8/2004 | Koo et al. | ............. | 455/426.1 |
| 7,539,175 B2 * | 5/2009 | White et al. | ............. | 370/350 |
| 2003/0143999 A1 | 7/2003 | Funato et al. | | |
| 2004/0203777 A1 | 10/2004 | Watanabe et al. | | |
| 2004/0248574 A1 | 12/2004 | Watanabe et al. | | |

FOREIGN PATENT DOCUMENTS

| | | |
|---|---|---|
| EP | 1467585 A2 | 10/2004 |
| JP | 7-162947 A | 6/1995 |
| JP | 2001-203829 A | 7/2001 |
| JP | 2001-285372 A | 10/2001 |
| JP | 2002-135203 A | 5/2002 |
| JP | 2002-186001 A | 6/2002 |
| JP | 3325856 B | 7/2002 |
| JP | 2003-143643 A | 5/2003 |
| JP | 2003-534720 A | 11/2003 |
| JP | 2004-282234 A | 10/2004 |
| JP | 2004-312589 A | 11/2004 |
| JP | 2004-336384 A | 11/2004 |
| WO | WO 00/28771 A1 | 5/2000 |
| WO | WO-01/91411 A1 | 11/2001 |
| WO | WO-2005/032061 A1 | 4/2005 |
| WO | WO-2005/032062 A1 | 4/2005 |

* cited by examiner

*Primary Examiner* — Charles N Appiah
*Assistant Examiner* — Kiet Doan
(74) *Attorney, Agent, or Firm* — Birch, Stewart, Kolasch & Birch, LLP

(57) ABSTRACT

An identification-information extracting unit extracts first identification information of a location registration area of a wireless communication system. A storage unit stores correspondence information concerning a relationship between the first identification information and second identification information of a location registration area managed by a communication network system. A location-registration requesting unit transmits location-registration request information for requesting a location registering device to perform a new location registration when the second identification information is updated by a movement of a mobile terminal.

24 Claims, 18 Drawing Sheets

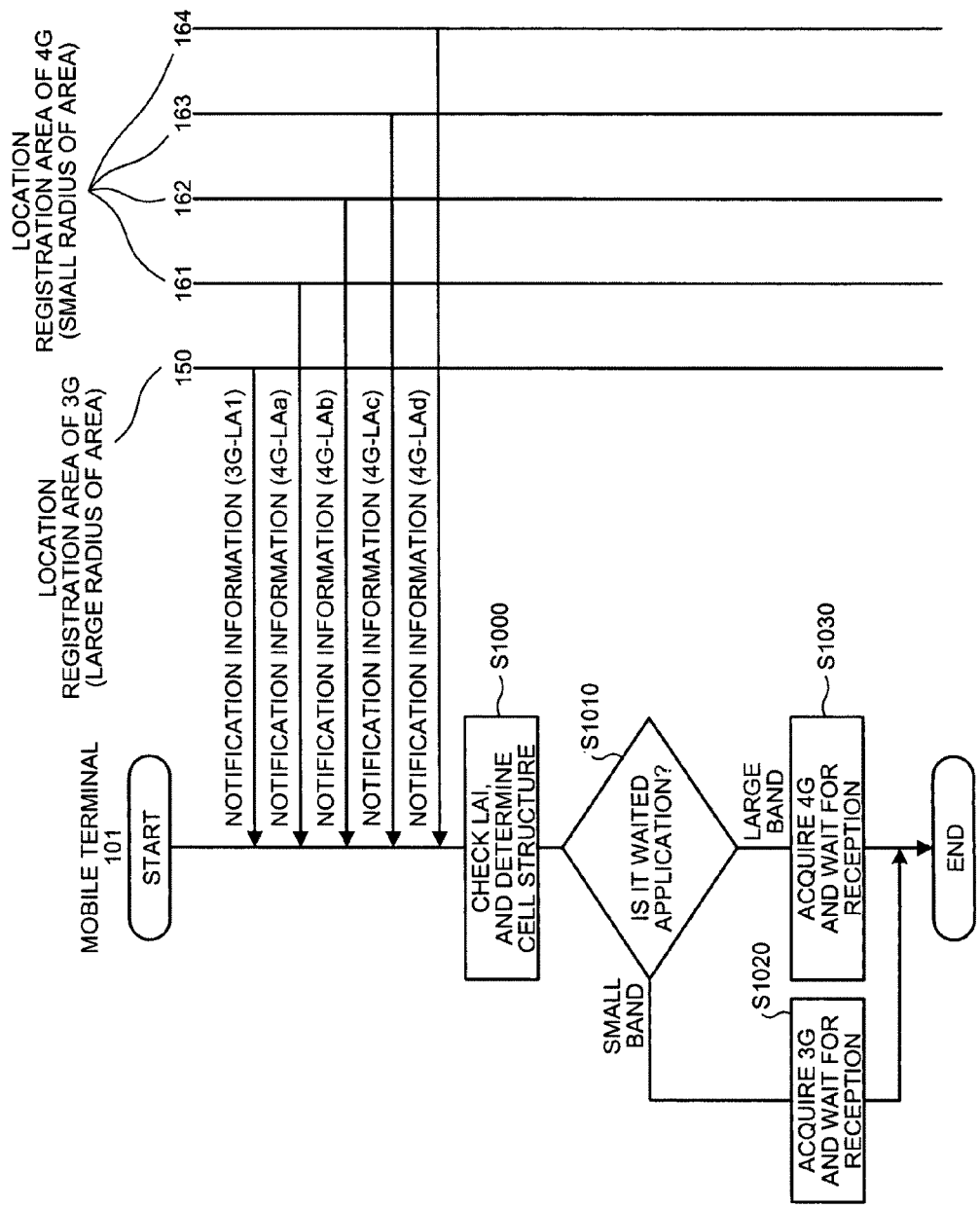

COMMUNICATION NETWORK SYSTEM AND MOBILE TERMINAL

TECHNICAL FIELD

The present invention relates to a communication network system that integrates heterogeneous wireless access systems, and a mobile terminal.

BACKGROUND ART

In mobile communications, not only voice communications but also access to the Internet, electronic mails, and image distribution and communications can be carried out relatively easily. Because of the convenience, many people are nowadays using the mobile communications, and a further development toward higher-speed and larger-capacity mobile communications is expected in recent years.

Wireless access systems such as the second-generation (2G) and the third-generation (3G) cellular systems and wireless LANs, the Bluetooth (registered trademark), and the UWB (Ultra Wide Band) are widely distributed. Among others, there is a system of integrating heterogeneous wireless access systems as the Beyond3G (4G) wireless network, and controlling the access system as one mobile communication network.

The integrated mobile communication system described in Patent Document 1 includes a database that stores data by relating a terminal ID (Identification) of a terminal to a location ID. A mobile communication manager receives a location registration message issued from a terminal present on an arbitrary platform, address-converts this message based on a corresponding database, and accesses a mobile communication database of other platform based on the converted address, thereby carrying out communications between the different platforms. A mobile management gateway monitors a message from a calling terminal, and allocates a suitable location ID indicating a moving destination, to this message.

Patent Document 1: Japanese Patent Application Laid-open No. 2001-285372

DISCLOSURE OF INVENTION

Problem to be Solved by the Invention

According to the conventional technique, a routing is carried out by executing an address conversion to connect between different platforms. However, because the different platforms are connected to each other at the gateway level, a location registration area itself depends on the platforms. Therefore, locations need to be registered at individual platforms. Consequently, the location registration area cannot be structured between the platforms.

The present invention has been achieved in view of the above problems, and it is an object of the present invention to provide a communication network system and a mobile terminal that can structure location registration areas between plural wireless systems, without depending on individual wireless systems and without giving alterations to the individual wireless systems.

Means for Solving Problem

To solve the above problems and to achieve the object, a communication network system according to the present invention includes a plurality of heterogeneous wireless communication systems and a location registering device that registers a location of a mobile terminal that communicates with the wireless communication systems. The mobile terminal includes a first identification-information extracting unit that extracts first identification information specific to a location registration area of each of the wireless communication systems from information received from each of the wireless communication systems, a first storage unit that stores therein correspondence information concerning a correspondence relationship between the first identification information and second identification information of a location registration area managed by the communication network system, and a location-registration requesting unit that extracts the second identification information corresponding to the first identification information based on the first identification information extracted by the identification-information extracting unit and the correspondence information stored in the first storage unit, and that transmits location-registration request information which requests the location registering device to carry out a new location registration when the second identification information is updated based on a move.

Effect of the Invention

The wireless communication network system according to the present invention extracts the second identification information of the location registration area managed by the communication network system, from the first identification information specific to the location registration area of each wireless communication system, based on the relationship between the first identification information and the second identification information. The wireless communication network system registers a new location in the location registering device when the second identification information is changed due to the move. Therefore, it becomes possible to identify location registration areas between overlaid wireless communication systems. The communication network system can structure flexible location registration areas between heterogeneous wireless communication systems. Consequently, the wireless communication network system can register locations of mobile terminals in the flexible location-registration areas between heterogeneous wireless communication systems.

BRIEF DESCRIPTION OF DRAWINGS

FIG. 20 depicts an operation procedure of a communication network system according to the eighth embodiment.

EXPLANATIONS OF LETTERS OR NUMERALS

Figure 1:
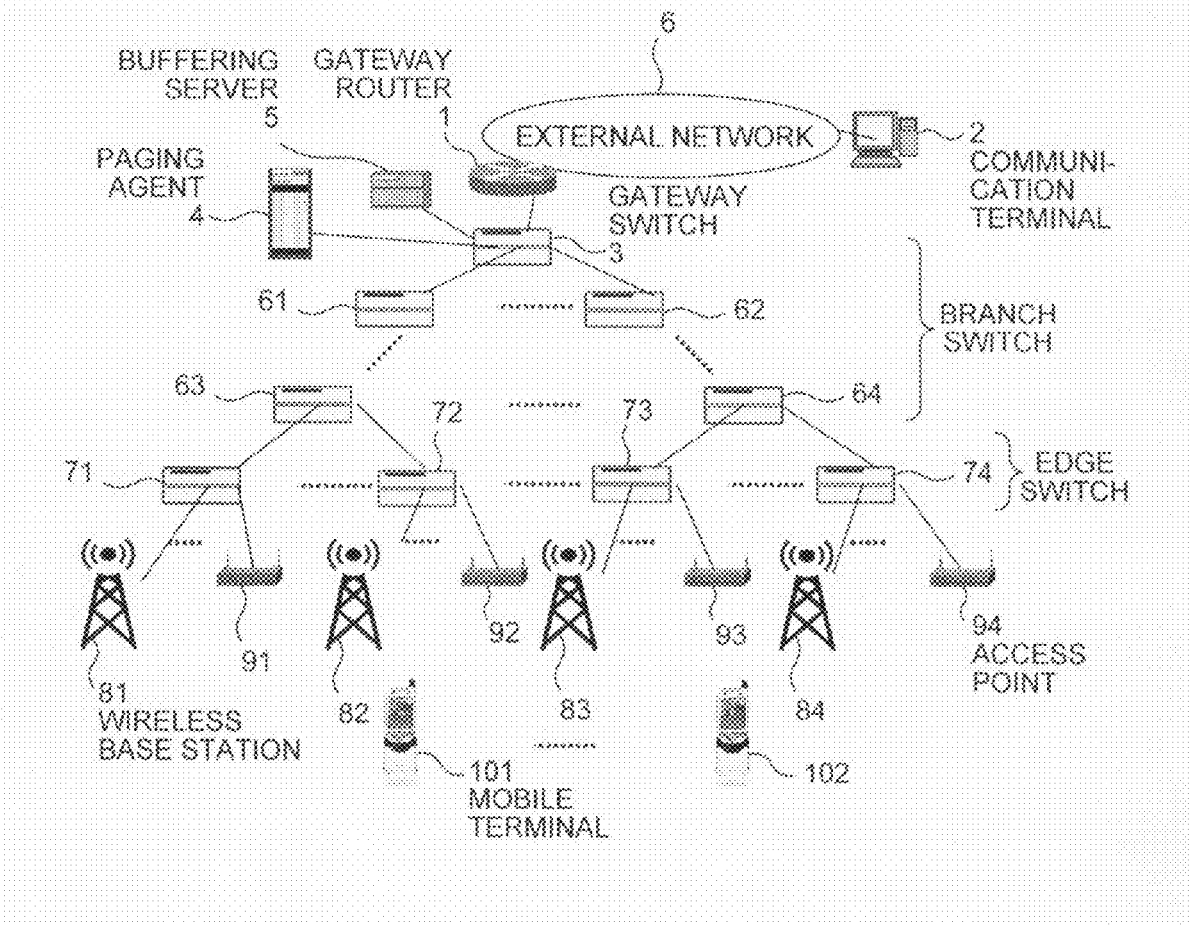
FIG. 1 is a system configuration diagram of a configuration of a communication network system according to a first embodiment.

1 Gateway router
2 Communication terminal
3 Gateway switch
4 Paging agent
5 Buffering server
6 External network
11, 41 Communication I/F unit
12, 42 Storage unit
13 Identification-information extracting unit
14 Identification-information comparing unit
15 Information obtaining unit
16 Change-information recognizing unit
17 Speed measuring unit
18 Wireless-system selecting unit
19, 49 Controller
43 Information providing unit
44 Capacity manager
45 Load status manager
61 to 64 Branch switch
71 to 74 Edge switch
81 to 84 Wireless base station
91 to 94 Access point
101, 102 Mobile terminal
111, 112, 122, 121, 122, 150, 161 to 164 Location registration area
130, 131 Identification information list

BEST MODE(S) FOR CARRYING OUT THE INVENTION

Exemplary embodiments of a communication network system and a mobile terminal according to the present invention are explained below in detail with reference to the accompanying drawings. Note that the present invention is not limited to the following embodiments.

First Embodiment

A first embodiment of the present invention is explained below with reference to FIG. 1 to FIG. 4. In the first embodiment, a mobile terminal includes a list (correspondence information) for converting location registration identifiers (first identification information) specific to individual wireless systems into location registration identifiers (second identification information) managed by a communication network system (heterogeneous-wireless integrated network) that integrates heterogeneous wireless systems.

FIG. 1 is a system configuration diagram of a configuration of the communication network system according to the first embodiment. The communication network system includes a gateway router 1, a communication terminal 2, a gateway switch 3, a paging agent (location registering device) 4, a buffering server 5, an external network 6, branch switches 61 to 64, edge switches 71 to 74, wireless base stations 81 to 84, access points 91 to 94, and mobile terminals 101 and 102.

The external network 6 is a communication network such as the Internet and the Intranet. The external network 6 is connected with the communication terminal 2 and the gateway router 1. The gateway router 1 connects (routes) the gateway to the external network 6 in the IP (Internet Protocol) layer.

The communication terminal 2 is a terminal such as a personal computer or a portable telephone that carries out communications by being connected to the external network 6. The communication terminal 2 communicates with the mobile terminals 101 and 102 using IP packets via the external network 6 and the gateway switch 3.

The paging agent 4 manages (pages) the receiving state of the mobile terminals 101 and 102. When the mobile terminals 101 and 102 shift to the waiting state, the paging agent 4 requests the gateway switch 3 to temporarily accumulate (store) a layer 2 frame destined to the mobile terminals 101 and 102.

The gateway switch 3 is connected to the gateway router 1, the buffering server 5, the paging agent 4, and the branch switches 61 and 62, and manages location information concerning locations of the total mobile terminals (the mobile terminals 101 and 102) in the communication network system. When the layer 2 frame is transmitted addressed to the mobile terminal 101 or 102 that shifts to the waiting state, the gateway switch 3 transfers the layer 2 frame to the buffering server 5.

The buffering server 5 temporarily accumulates the layer 2 frame addressed to the mobile terminal 101 or 102 transferred from the gateway switch 3, and notifies the paging agent 4 that the layer 2 frame has been transmitted. Upon receiving a transfer instruction of the layer 2 frame from the paging agent 4, the buffering server 5 transfers the temporarily-accumulated layer 2 frame to the gateway switch 3.

The branch switches 61 to 64 and the edge switches 71 to 74 are connected to each other in mesh. The branch switches 61 to 64 are positioned between the edge switches 71 to 74 and the gateway switch 3, and relay (transfer) the layer 2 frames transmitted and received between the edge switches 71 to 74 and the gateway switch 3. In the present example, the connection of the branch switches 61 and 62 to the gateway switch 3 is shown. The branch switch 63 is connected to the branch switch 61, and the branch switch 64 is connected to the branch switch 62. The branch switch 61 is connected to the branch switch 62, and the branch switch 63 is connected to the branch switch 64.

The edge switches 71 to 74 are connected to the branch switches 63 and 64. In the present example, the edge switches 71 and 72 are connected to the branch switch 63, and the edge switches 71 and 72 are connected to the branch switch 63. The edge switch 71 is connected to the edge switch 72, and the edge switch 73 is connected to the edge switch 74. The edge switches 71 to 74 accommodate the wireless base stations 81 to 84 and the access points 91 to 94 corresponding to various kinds of wireless systems. The edge switches 71 to 74 relay information transmitted and received between the wireless base stations 81 to 84, the access points 91 to 94, and the branch switches 61 to 64. The wireless base stations 81 to 84 and the access points 91 to 94 are connected to the mobile terminals 101 and 102 at predetermined wireless interfaces.

The mobile terminals 101 and 102 are movable communication terminals such as a portable telephone, a PHS (Personal Handyphone System), and a PDA (Personal Digital Assistant), and move in service areas (LA and VLA described later) managed by the wireless base stations 81 to 84 and the access points 91 to 94. The mobile terminals 101 and 102 are connected to a hierarchical layer 2 network or the like at predetermined wireless interfaces provided by the wireless base stations 81 to 84 and the access points 91 to 94.

In the communication network system, the mobile terminals 101 and 102 move in location registration areas (hereinafter, also LA (Location Area)) of the individual wireless systems, and location registration areas (hereinafter, also VLA (Virtual Location Area)) managed by the communication network system.

Figure 2:
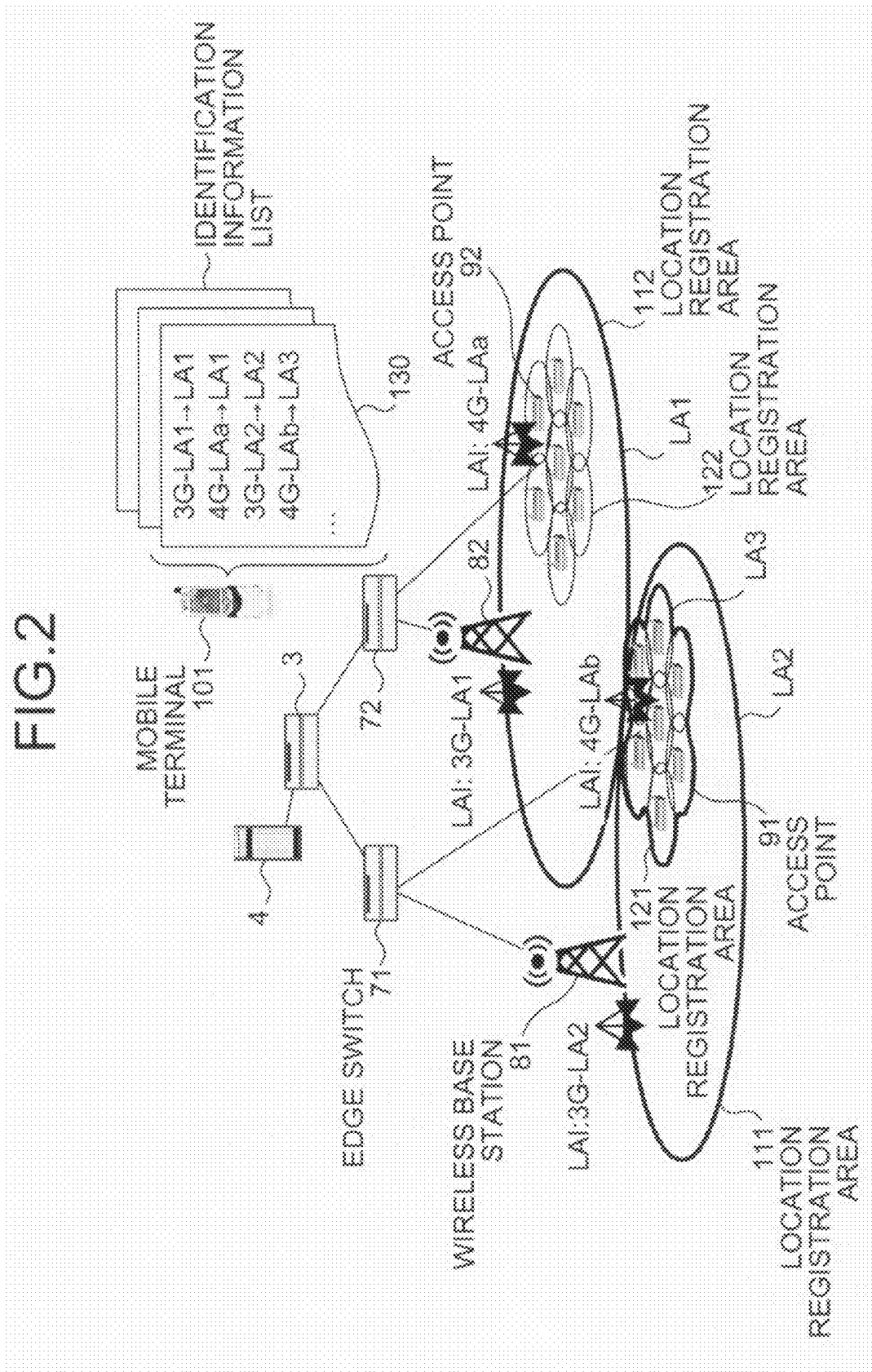
FIG. 2 is an explanatory diagram of a relationship between an LA and a VLA of the communication network system according to the first embodiment.

FIG. 2 is an explanatory diagram of a relationship between the LA and the VLA of the communication network system according to the first embodiment. FIG. 2 depicts the communication network system omitting the branch switches 61 to 64.

The wireless base station 81 connected to the edge switch 71 can communicate with the mobile terminals 101 and 102 within a location registration area 111 of a third-generation (3G) mobile communication system. The plural access points 91 connected to the edge switch 71 can communicate with the mobile terminals 101 and 102 within a location registration area 121 of a fourth-generation (4G) mobile communication system.

In the present example, as location registration identifiers (LAI (Location Area Identification)) specific to each wireless system, the LAI of the location registration area 111 is an identifier "LAI:3G-LA2", and the LAI of the location registration area 121 is an identifier "LAI:4G-LAb". As location registration identifiers (VLAI (Virtual Location Area Identification)) managed by the communication network system, the VLAI of the location registration area 111 is "LA2", and the VLAI of the location registration area 121 is "LA3".

Further, the wireless base station 82 connected to the edge switch 72 can communicate with the mobile terminals 101 and 102 within a location registration area 112 of the third-generation mobile communication system. The plural access points 92 connected to the edge switch 72 can communicate with the mobile terminals 101 and 102 within a location registration area 122 of the fourth-generation mobile communication system.

In the present example, the LAI of the location registration area 112 is an identifier "LAI:3G-LA1", and the LAI of the location registration area 122 is an identifier "LAI:4G-LAa". The VLAI of the location registration area 112 and 122 is "LA2".

That is, the "LAI:3G-LA1" of the location registration area 112 corresponds to the VLAI (LA1), the "LAI:4G-LAa" of the location registration area 122 corresponds to the VLAI (LA1), the "LAI:3G-LA2" of the location registration area 111 corresponds to the VLAI (LA2), and the "LAI:4G-LAb" of the location registration area 121 corresponds to the VLAI (LA3). Each mobile terminal 101 (102) stores a table of correspondence (hereinafter, identification information list 130) between the LAI and the VLAI.

Figure 3:
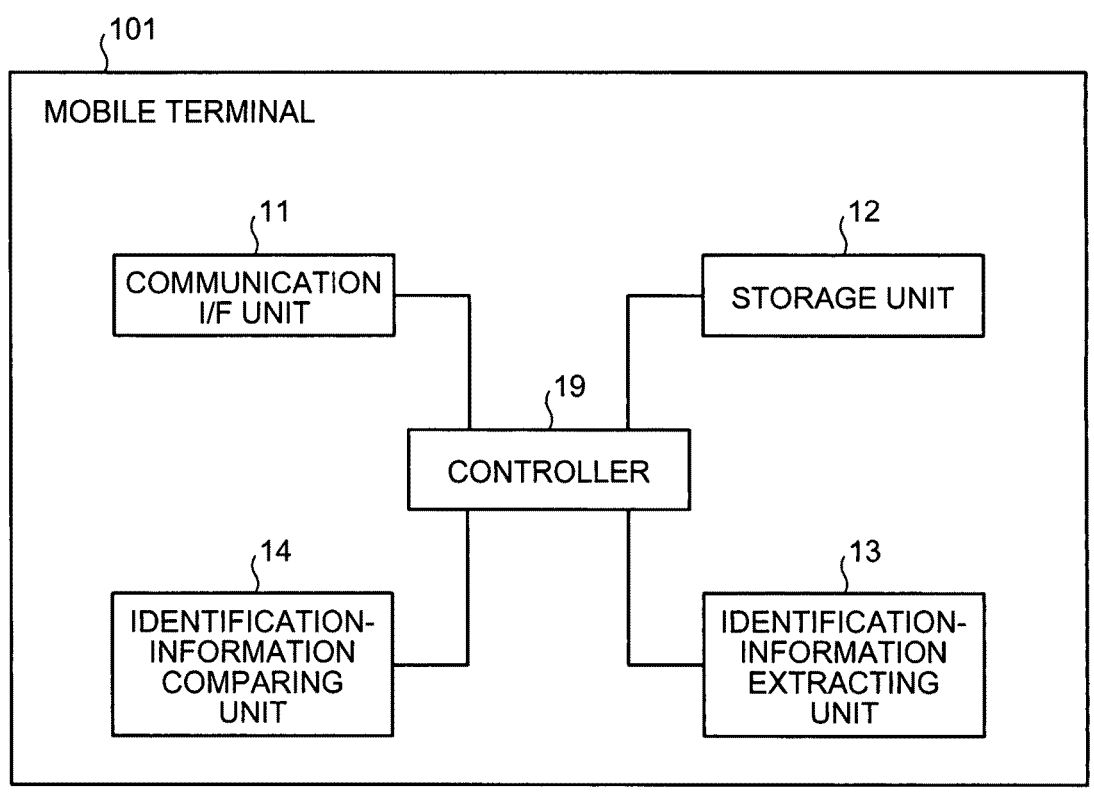
FIG. 3 is a block diagram of a configuration of a mobile terminal according to the first embodiment.

Configurations of the mobile terminals 101 and 102 are explained next. Because the mobile terminals 101 and 102 have similar configurations, the mobile terminal 101 is explained as an example. FIG. 3 is a block diagram of the configuration of the mobile terminal according to the first embodiment.

The mobile terminal 101 includes a communication I/F unit 11, a storage unit (first storage unit) 12, an identification-information extracting unit 13, an identification-information comparing unit (location-registration requesting unit) 14, and a controller 19. The communication I/F unit 11 is the communication interface that transmits and receives information the wireless base stations 81 to 84 and the access points 91 to 94. The storage unit 12 stores the identification information list 130.

The identification-information extracting unit 13 extracts the LAI of each wireless system from notification information (System Information) received from the wireless base stations 81 to 84 and the access points 91 to 94 (the wireless systems).

The identification-information comparing unit 14 extracts the VLAI corresponding to the LAI extracted by the identification-information extracting unit 13, based on the LAI extracted by the identification-information extracting unit 13 and the identification information list 130 stored by the storage unit 12. The identification-information comparing unit 14 stores in advance the VLAI extracted by the identification-information extracting unit 13, and determines whether there has been a change in the VLAI extracted this time by the identification-information extracting unit 13. The controller 19 controls the communication I/F unit 11, the storage unit 12, the identification-information extracting unit 13, and the identification-information comparing unit 14.

Figure 4:
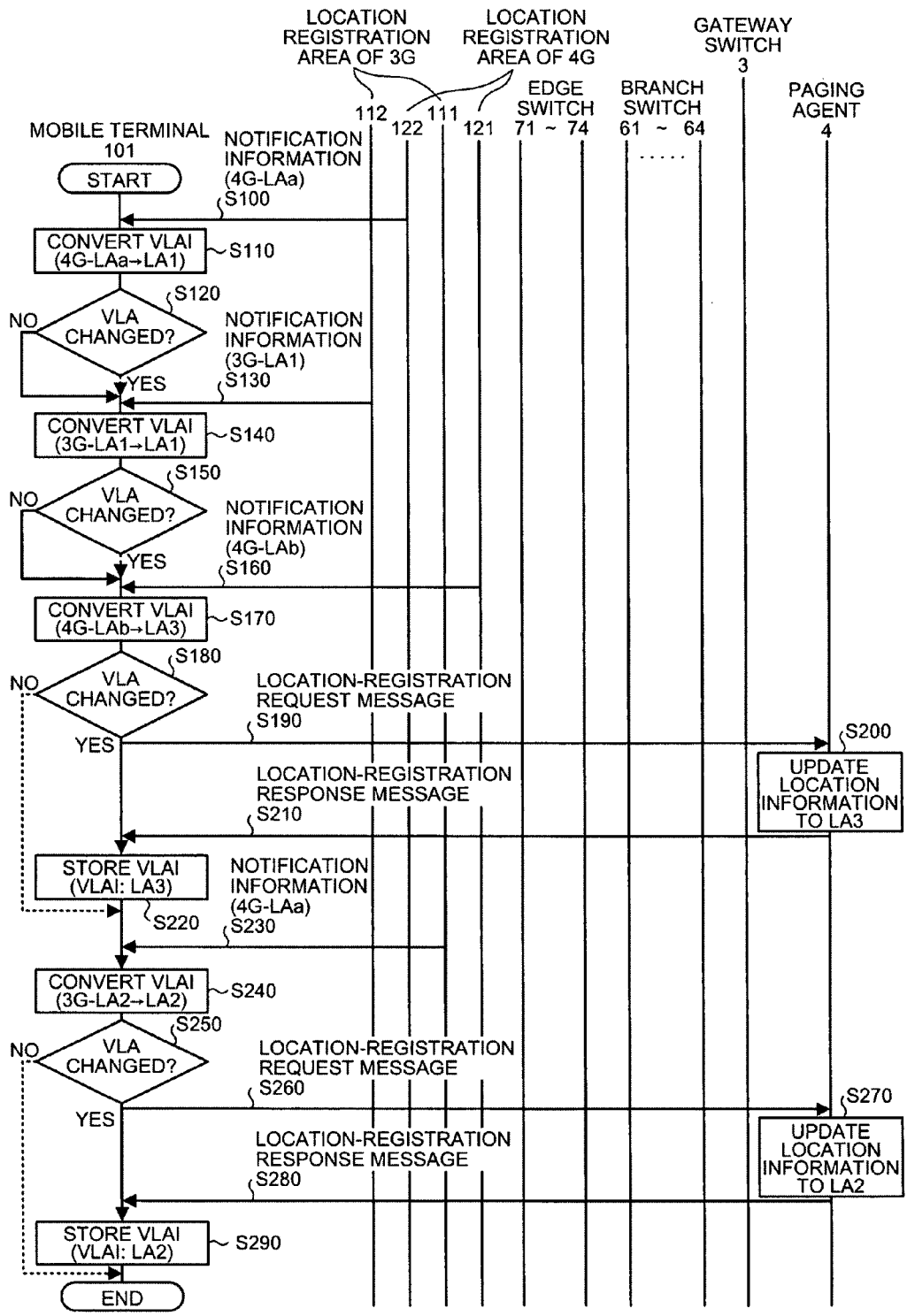
FIG. 4 depicts an operation procedure of the communication network system according to the first embodiment.

An operation procedure of the communication network system according to the first embodiment is explained next. FIG. 4 depicts the operation procedure of the communication network system according to the first embodiment. As one example of a move of the mobile terminal 101, there is explained below the move of the mobile terminal 101 in the waiting state in the order of the location registration area 122 (LAI:4G-LAa) of the 4G, the location registration area 112 (LAI:3G-LA1) of the 3G, the location registration area 121 (LAI:4G-LAb) of the 4G, and the location registration area 111 (LAI:3G-LA2) of the 3G.

Because the mobile terminal 101 is first located in the location registration area 122, the paging agent 4 stores the VLA (LA1) of the mobile terminal 101. The paging agent stores in advance the identification information list 130 into the storage unit 12 of the mobile terminal 101.

The mobile terminal 101 first receives the notification information (the System Information) from the access point 92 via the communication I/F unit 11 in the location registration area 122 of the 4G (step S100). The notification information contains the location registration identifier (LAI) specific to each wireless system.

The identification-information extracting unit 13 of the mobile terminal 101 extracts the "LAI:4G-LAa" as the location registration identifier of the 4G from the received notification information. The identification-information comparing unit 14 of the mobile terminal 101 obtains the VLAI corresponding to the extracted LAI (converts the LAI into the VLAI), based on the identification information list 130 stored in the storage unit 12 (step S110). In this case, because the "LAI:4G-LAa" of the location registration area 122 corresponds to the VLAI (LA1), the identification-information comparing unit 14 extracts the VLAI (LA1).

The identification-information comparing unit 14 of the mobile terminal 101 compares the VLAI extracted this time with the VLAI held by the identification-information comparing unit 14 (step S120). Because the VLAI extracted this time has the same value (LA1) as that of the VLAI held by the identification-information comparing unit 14, the identification-information comparing unit 14 determines that there is no change in the VLA, and the mobile terminal 101 maintains the receiving state. The identification-information comparing unit 14 keeps holding the held VLAI.

Next, the mobile terminal 101 moves to the location registration area 112 of the 3G. The mobile terminal 101 receives the notification information from the wireless base station 82 via the communication I/F unit 11 in the location registration area 112 of the 3G (step S130).

The identification-information extracting unit 13 of the mobile terminal 101 extracts the "LAI:3G-LA1" as the location registration identifier of the 4G from the received notification information. The identification-information comparing unit 14 of the mobile terminal 101 obtains the VLAI corresponding to the LAI extracted by the identification-information extracting unit 13, based on the identification information list 130 stored in the storage unit 12 (step S140). In this case, because the "LAI:3G-LA1" of the location registration area 112 corresponds to the VLAI (LA1) in the identification information list 130, the identification-information comparing unit 14 extracts the VLAI (LA1).

The identification-information comparing unit 14 of the mobile terminal 101 compares the VLAI extracted this time with the VLAI held by the identification-information comparing unit 14 (step S150). Because the VLAI extracted this time has the same value (LA1) as that of the VLAI held by the identification-information comparing unit 14, the identification-information comparing unit 14 determines that there is no change in the VLA, and the mobile terminal 101 maintains the receiving state. The identification-information comparing unit 14 keeps holding the held VLAI.

Next, the mobile terminal 101 moves to the location registration area 121 of the 4G. The mobile terminal 101 receives the notification information from the access point 91 via the communication I/F unit 11 in the location registration area 121 of the 3G (step S160).

The identification-information extracting unit 13 of the mobile terminal 101 extracts the "LAI:3G-LAb" as the location registration identifier of the 4G from the received notification information. The identification-information comparing unit 14 of the mobile terminal 101 obtains the VLAI corresponding to the LAI extracted by the identification-information extracting unit 13, based on the identification information list 130 stored in the storage unit 12 (step S170). In this case, because the "LAI:4G-LAb" of the location registration area 121 corresponds to the VLAI (LA3) in the identification information list 130, the identification-information comparing unit 14 extracts the VLAI (LA3).

The identification-information comparing unit 14 of the mobile terminal 101 compares the VLAI extracted this time with the VLAI held by the identification-information comparing unit 14 (step S180). Because the VLAI (LA3) extracted this time has a different value from that of the VLAI (LA1) held by the identification-information comparing unit 14, the identification-information comparing unit 14 determines that the VLA has changed, and transmits a location-registration request (Location Area Update) message (request information) to the paging agent 4 (step S190). The location-registration request message is the information which requests the paging agent 4 to register the information (VLA) concerning the own location.

The location-registration request message from the mobile terminal 101 is transmitted to the paging agent 4 via the access point 91, the edge switch 71, the branch switches 63 and 61, and the gateway switch 3, for example.

The paging agent 4 updates the managed VLA (location information) of the mobile terminal 101, based on the location-registration request message transmitted from the mobile terminal 101 (step S200). The paging agent 4 updates the VLA of the mobile terminal 101 from the LA1 to the LA3, and stores the updated value.

The paging agent 4 transmits a location-registration response (Location Area Update Accept) message (response information) indicating the acceptance of the location-registration request message, to the mobile terminal 101 (step S210). The location-registration response message from the paging agent 4 is transmitted to the mobile terminal 101 via the gateway switch 3, the branch switches 61 and 63, the edge switch 71, and the access point 91, for example.

Upon receiving the location-registration response message from the paging agent 4 via the communication I/F unit 11, the mobile terminal 101 recognizes that the location registration has been completed. The identification-information comparing unit 14 of the mobile terminal 101 updates the held VLAI (LA1) to the VLAI (LA3), and stores the updated value (step S220).

Next, the mobile terminal 101 moves to the location registration area 111. The mobile terminal 101 receives the notification information from the wireless base station 81 via the communication I/F unit 11 in the location registration area 111 of the 3G (step S230).

The identification-information extracting unit 13 of the mobile terminal 101 extracts the "LAI:3G-LA2" as the location registration identifier of the 3G from the received notification information. The identification-information comparing unit 14 of the mobile terminal 101 obtains the VLAI corresponding to the LAI extracted by the identification-information extracting unit 13, based on the identification information list 130 stored in the storage unit 12 (step S240). In this case, because the "LAI:3G-LA2" of the location registration area 111 corresponds to the VLAI (LA2), the identification-information comparing unit 14 extracts the VLAI (LA2).

The identification-information comparing unit 14 of the mobile terminal 101 compares the VLAI extracted this time with the VLAI held by the identification-information comparing unit 14 (step S250). Because the VLAI (LA2) extracted this time has a different value from that of the VLAI (LA3) held by the identification-information comparing unit 14, the identification-information comparing unit 14 determines that the VLA has changed, and transmits a location-registration request message to the paging agent 4 (step S260).

The paging agent 4 updates the managed VLA of the mobile terminal 101, based on the location-registration request message transmitted from the mobile terminal 101 (step S270). The paging agent 4 updates the VLA of the mobile terminal 101 from the LA3 to the LA2, and stores the updated value.

The paging agent 4 transmits a location-registration response message to the mobile terminal 101 (step S280). Upon receiving the location-registration response message from the paging agent 4, the mobile terminal 101 recognizes that the location registration has been completed. The identification-information comparing unit 14 of the mobile terminal 101 updates the held VLAI (LA3) to the VLAI (LA2), and stores the updated value (step S290).

When the mobile terminal 101 has shifted to the waiting state, the paging agent 4 requests the gateway switch 3 to temporarily accumulate the layer 2 frame destined to the mobile terminal 101. The gateway switch 3 receives the request for temporarily accumulating the layer 2 frame, and when the layer 2 frame is transmitted to the mobile terminal 101 that has shifted to the waiting state, the gateway switch 3 transfers the layer 2 frame to the buffering server 5. The buffering server 5 temporarily accumulates the layer 2 frame destined to the mobile terminal 101 until when the transfer request is instructed from the paging agent 4, and notifies the paging agent 4 that the layer 2 frame has been transmitted. The paging agent 4 pages the mobile terminal 101 based on this notification.

As explained above, the mobile terminal 101 includes the list (the identification information list 130) for converting the location registration identifier (LAI) specific to the individual wireless system into the location registration identifier (VLAI) managed by the heterogeneous-wireless integrated network. Accordingly, the mobile terminal 101 can identify location registration areas (LA) between the overlaid wireless systems.

According to the first embodiment, the mobile terminal 101 includes the identification information list 130 to enable the mobile terminal 101 to identify the location registration areas between the overlaid wireless systems. Therefore, the communication network system can structure flexible location registration areas (VLA) between heterogeneous wireless systems.

Second Embodiment

A second embodiment of the present invention is explained next with reference to FIGS. 5 to 7. According to the second embodiment, in the communication network system shown in FIG. 1, the mobile terminal 101 dynamically receives the identification information list 130 from within the communication network system, thereby obtaining (downloading) the identification information list 130.

Figure 5:
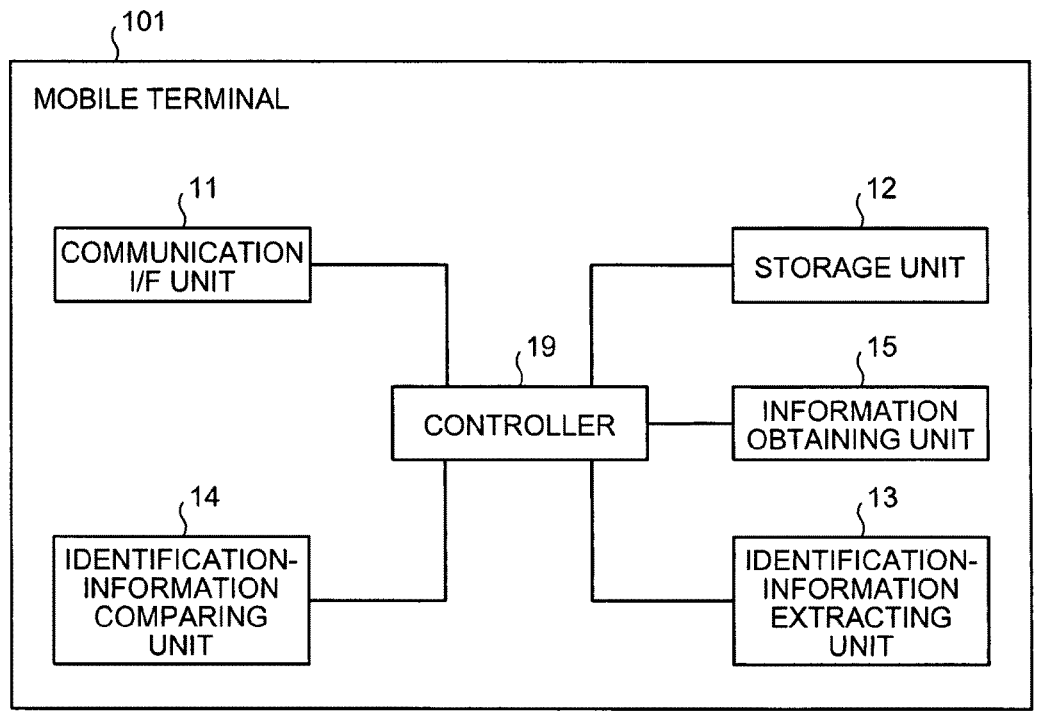
FIG. 5 is a block diagram of a configuration of a mobile terminal according to a second embodiment.

FIG. 5 is a block diagram of a configuration of the mobile terminal according to the second embodiment. Among the constituent elements shown in FIG. 5, elements that achieve the same functions as those of the mobile terminal 101 according to the first embodiment shown in FIG. 3 are denoted by like reference numerals, and redundant explanations thereof will be omitted. The mobile terminal 101 includes the communication I/F unit 11, the storage unit 12, the identification-information extracting unit 13, the identification-information comparing unit 14, an information obtaining unit (correspondence-information obtaining unit) 15, and the controller 19.

The information obtaining unit 15 transmits a message (identification-information-list request message described later) which requests a new identification information list 130 and an updated identification information list 130, to the paging agent 4, and obtains the identification information list 130 from the paging agent 4. The controller 19 controls the communication I/F unit 11, the storage unit 12, the identification-information extracting unit 13, the identification-information comparing unit 14, and the information obtaining unit 15.

Figure 6:
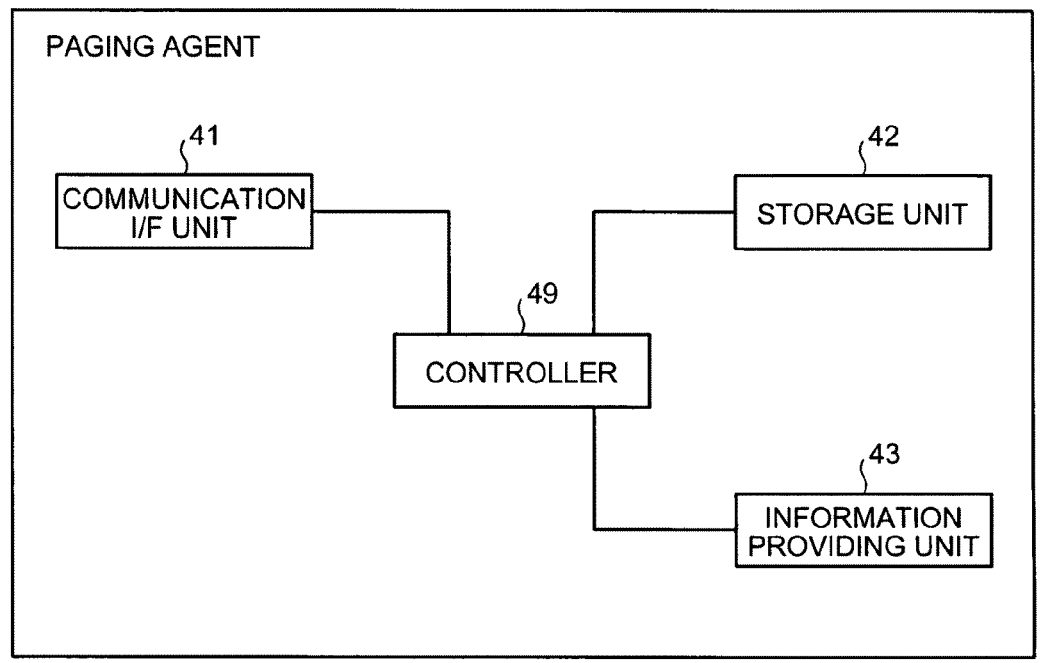
FIG. 6 is a block diagram of a configuration of a paging agent according to the second embodiment.

FIG. 6 is a block diagram of a configuration of the paging agent according to the second embodiment. The paging agent 4 includes a communication I/F unit 41, a storage unit (second storage unit) 42, an information providing unit 43, and a controller 49. The communication I/F unit 41 is the communication interface that transmits and receives various kinds of information to and from the gateway switch 3. The storage unit 42 stores the identification information list 130.

When there are requests for a change of a network configuration in the communication network system and requests for the identification information list 130 from the mobile terminals 101 and 102, the information providing unit 43 transmits the identification information list 130 stored in the storage unit 42 to the mobile terminals 101 and 102. The controller 49 controls the communication I/F unit 41, the storage unit 42, and the information providing unit 43.

Figure 7:
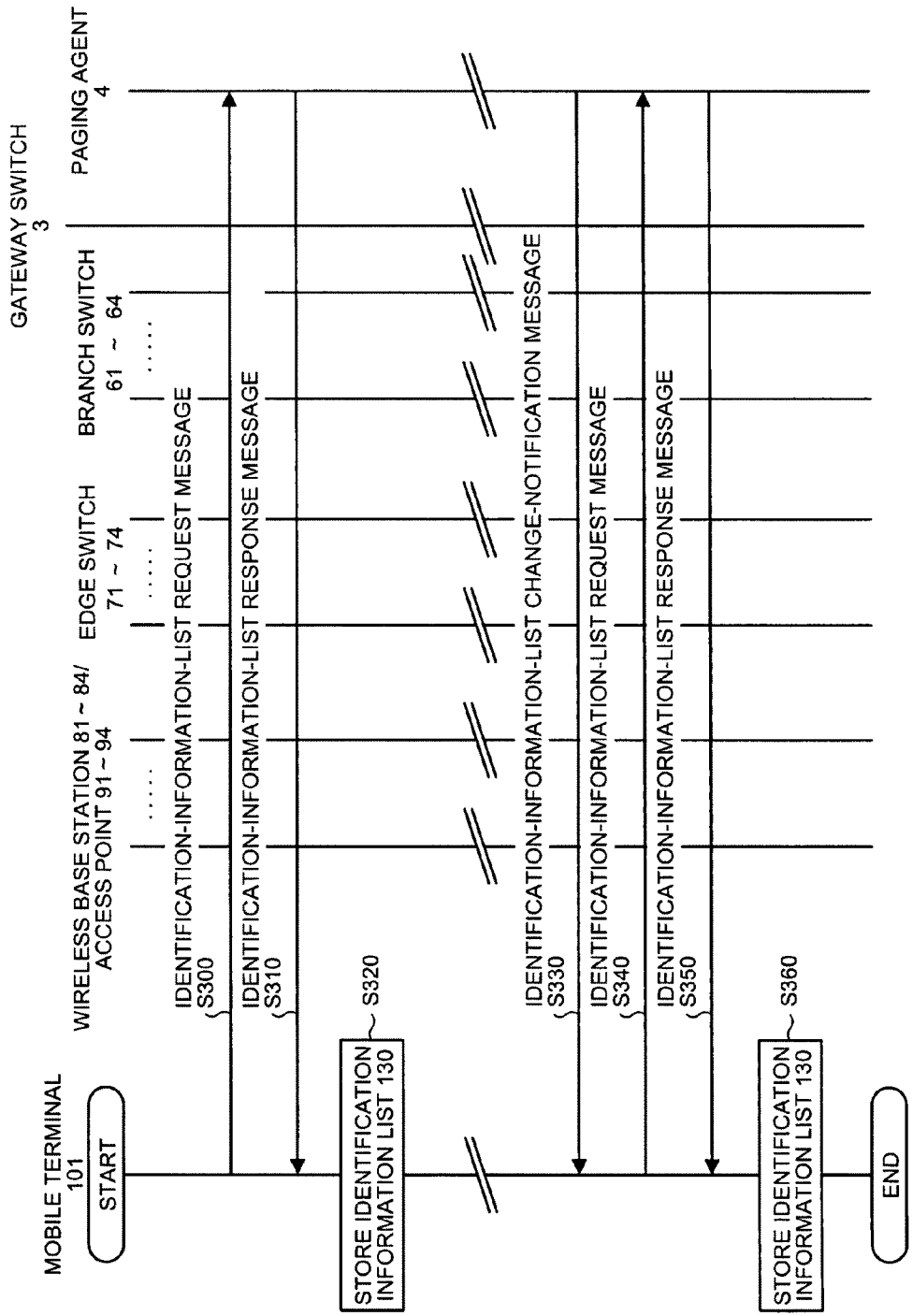
FIG. 7 depicts an operation procedure of a communication network system according to the second embodiment.

FIG. 7 depicts an operation procedure of the communication network system according to the second embodiment. The information obtaining unit 15 of the mobile terminal 101 transmits a message (identification-information-list request message) which requests the identification information list 130 at an arbitrary timing after registering the first location when the power supply is ON, to the paging agent 4 via the communication I/F unit 11 (step S300).

The paging agent 4 receives the identification-information-list request message via the communication I/F unit 41. The information providing unit 43 of the paging agent 4 transmits a message (identification-information-list response message) containing the identification information list 130 to the mobile terminal 101 via the communication I/F unit 41, following the request from the mobile terminal 101 (step S310).

Upon receiving the identification-information-list response message via the communication I/F unit 11, the information obtaining unit 15 of the mobile terminal 101 extracts the identification information list 130 contained in this message, and stores this list into the storage unit 12 (step S320).

When there is a change of a network configuration in the communication network system, the information providing unit 43 of the paging agent 4 transmits a message (identification-information-list change-notification message) indicating a change of the identification information list 130, to the mobile terminal 101 via the communication I/F unit 41 (step S330). With this arrangement, the paging agent 4 urges the mobile terminal 101 to request the paging agent 4 for the identification information list 130.

Upon receiving the identification-information-list change-notification message from the paging agent 4 via the communication I/F unit 11, the information obtaining unit 15 of the mobile terminal 101 transmits a message (identification-information-list request message) which requests the changed identification information list 130, to the paging agent 4 (step S340).

The paging agent 4 receives the identification-information-list request message via the communication I/F unit 41. The information providing unit 43 of the paging agent 4 transmits a message (identification-information-list response message) containing the identification information list 130 to the mobile terminal 101 via the communication I/F unit 41, following the request from the mobile terminal 101 (step S350).

Upon receiving the identification-information-list response message, the information obtaining unit 15 of the mobile terminal 101 extracts the identification information list 130 contained in this message, and stores this list into the storage unit 12 (step S360). Thereafter, the mobile terminal 101 moves while identifying the location registration areas between the overlaid wireless systems, in the procedure explained with reference to FIG. 3 in the first embodiment.

While the storage unit 12 of the paging agent 4 stores the identification information list 130 in the second embodiment, other device within the communication network can also store the identification information list 130. In this case, upon receiving the information request message from the mobile terminal 101, the information providing unit 43 of the paging agent 4 makes the identification information list 130 to be transmitted from the device storing the identification information list 130 to the mobile terminal 101.

Because the mobile terminal 101 includes the information obtaining unit 15 as described above, the mobile terminal 101 can dynamically, not statically, download from the communication network, the identification information list 130 as the correspondence list of the location registration identifiers of the individual wireless systems and the identifiers of the location registration areas managed by the heterogeneous-wireless integrated communication network system.

As explained above, according to the second embodiment, the mobile terminal 101 can dynamically, and not statically, download the identification information list 130 from the communication network side, and can easily change the identification information list 130.

Third Embodiment

A third embodiment of the present invention is explained next with reference to FIGS. 8 and 9. According to the third embodiment, in the communication network system shown in FIG. 1, when the mobile terminal 101 receives a location registration identifier (LAI) specific to the individual wireless systems not contained in the identification information list 130, the mobile terminal 101 recognizes a change of the location registration area managed by the communication network system. After recognizing the change of the location registration area managed by the communication network system, the mobile terminal 101 dynamically receives a new identification information list 130 from the communication network system, thereby obtaining the identification information list 130.

Figure 8:
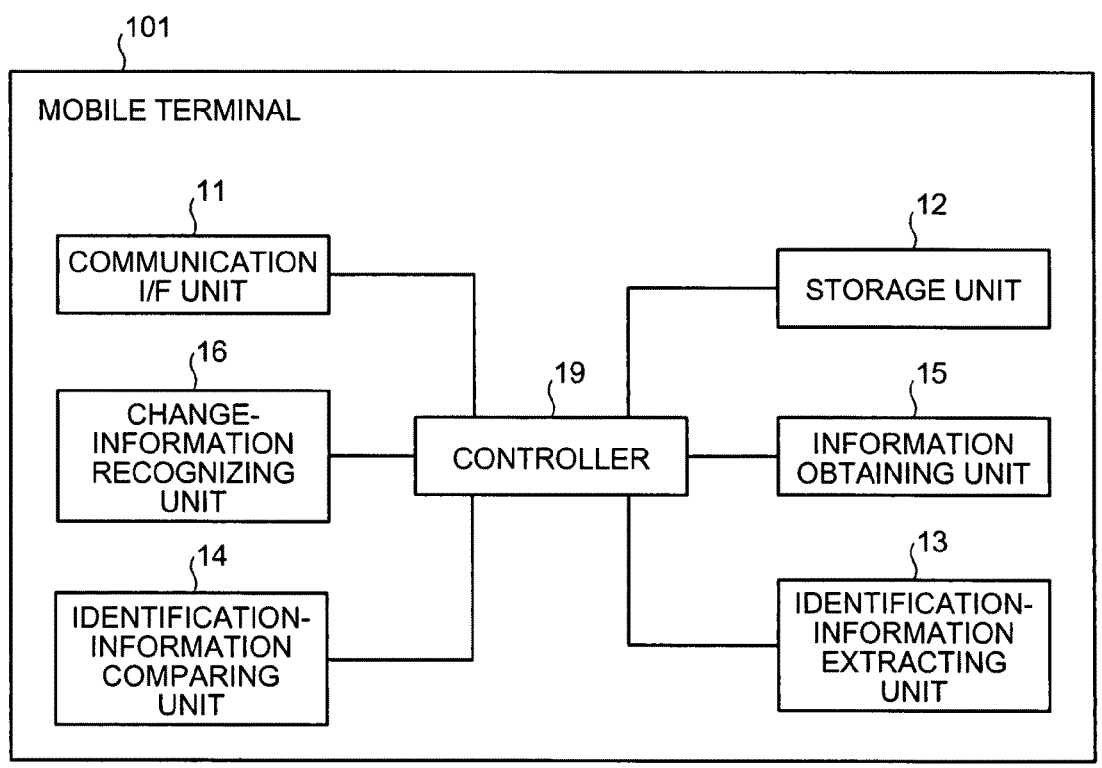
FIG. 8 is a block diagram of a configuration of a mobile terminal according to a third embodiment.

FIG. 8 is a block diagram of a configuration of the mobile terminal according to the third embodiment. Among the constituent elements shown in FIG. 8, elements that achieve the same functions as those of the mobile terminals 101 according to the first and second embodiments shown in FIGS. 3 and 5 are denoted by like reference numerals, and redundant explanations thereof will be omitted. The mobile terminal 101 includes the communication I/F unit 11, the storage unit 12, the identification-information extracting unit 13, the identification-information comparing unit 14, the information obtaining unit 15, a change-information recognizing unit 16, and the controller 19.

The change-information recognizing unit 16 extracts the identifier (LAI) of the location registration area from the notification information, and determines whether the extracted LAI is present in the identification information list 130 stored in the storage unit 12. The change-information recognizing unit 16 determines a change of the VLA based on whether the extracted LAI is present in the identification information list 130 stored in the storage unit 12. The controller 19 includes the communication I/F unit 11, the storage unit 12, the identification-information extracting unit 13, the identification-information comparing unit 14, the information obtaining unit 15, and the change-information recognizing unit 16.

Figure 9:
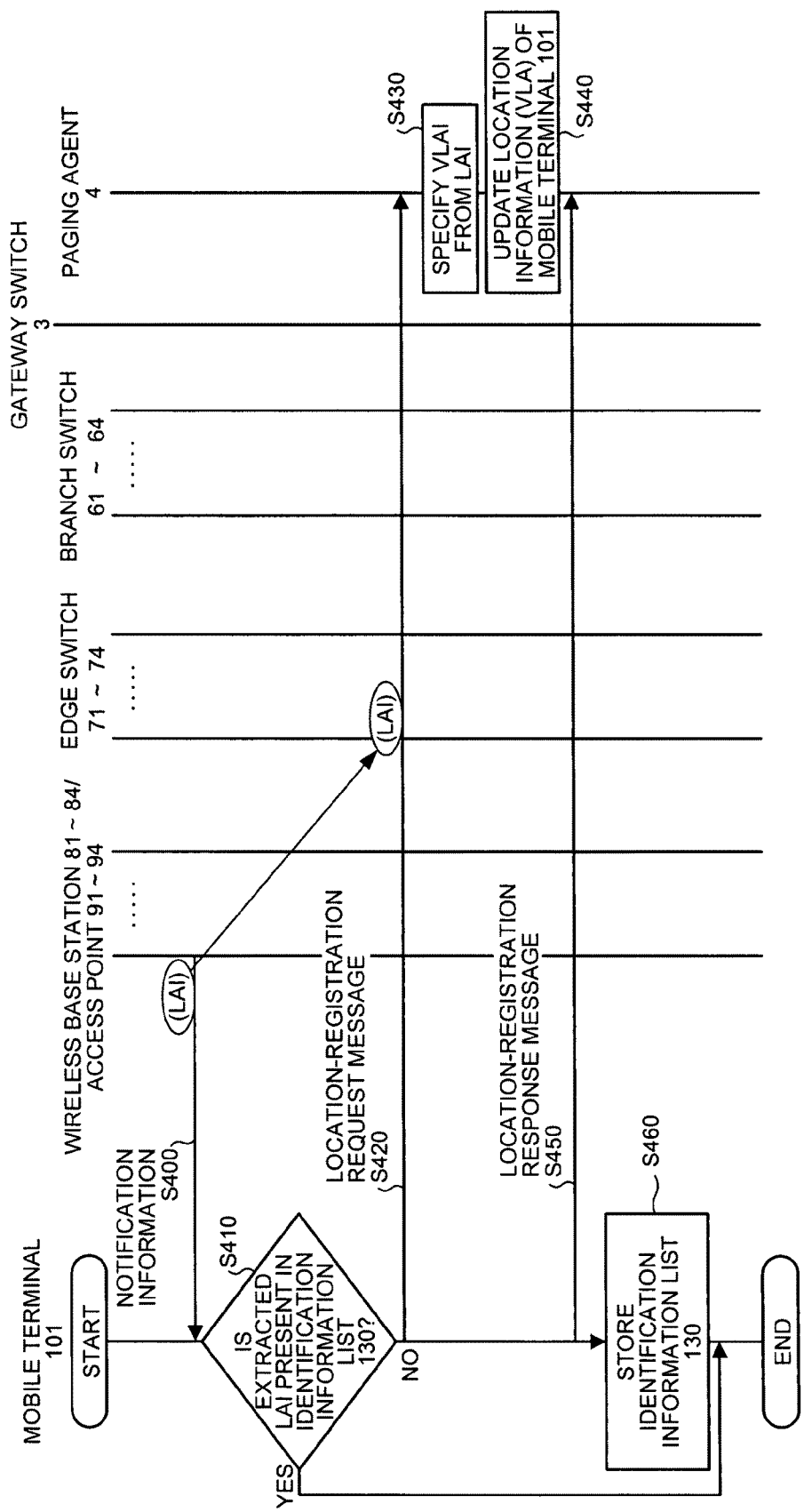
FIG. 9 depicts an operation procedure of a communication network system according to the third embodiment.

FIG. 9 depicts an operation procedure of the communication network system according to the third embodiment. The mobile terminal 101 in the waiting state receives notification information from the wireless system acquired by the mobile terminal 101 (any one of the wireless base stations 81 to 84 and the access points 91 to 94 corresponding to the communication area of the mobile terminal 101), via the communication I/F unit 11 (step S400).

The change-information recognizing unit 16 of the mobile terminal 101 extracts the identifier (LAI) of the location registration area from the notification information, and determines whether the extracted LAI is present in the identification information list 130 stored in the storage unit 12 (step S410). When the extracted LAI is not present in the identification information list 130 stored in the storage unit 12, the change-information recognizing unit 16 determines that the VLA has changed.

Upon determining that the VLA has changed, the change-information recognizing unit 16 transmits a location-registration request message containing the extracted LAI to the paging agent 4 via the communication I/F unit 11 (step S420). The paging agent 4 receives the location-registration request message via the communication I/F unit 41.

The information providing unit 43 of the paging agent 4 specifies the VLAI from the VAI contained in the location-registration request message transmitted based on the identification information list 130 (step S430), and updates the VLA of the mobile terminal 102 stored (location-managed) in the storage unit 42 (step S440).

The information providing unit 43 of the paging agent 4 adds the identification information list 130 containing the specified VLA, to a location-registration response message, and transmits this message to the mobile terminal 101 via the communication I/F unit 41 (step S450).

Upon receiving the location-registration response message from the paging agent 4 via the communication I/F unit 11, the mobile terminal 101 recognizes that the location registration has been completed. The identification-information extracting unit 13 of the mobile terminal 101 extracts the identification information list 130 from the location-registration response message, and stores the identification information list 130 into the storage unit 12 (step S460). Thereafter, the mobile terminal 101 moves while identifying the location registration areas between the overlaid wireless systems, following the procedure explained with reference to FIG. 3 in the first embodiment.

As explained above, because the mobile terminal 101 has the change-information recognizing unit 16, the change-information recognizing unit 16 can extract the identifier (LAI) of the location registration area from the notification information, and can determine whether the extracted LAI is present in the identification information list 130 stored in the storage unit 12. Based on the operation, the change-information recognizing unit 16 can easily recognize a change of the location registration area (VLA) managed by the communication network system.

As explained above, according to the third embodiment, the mobile terminal 101 can easily recognize the change of the location registration area (VLA). Therefore, the mobile terminal 101 can request the paging agent 4 to provide the identification information list 130, and can easily obtain the minimum necessary identification information list 130.

Fourth Embodiment

A fourth embodiment of the present invention is explained next with reference to FIGS. 10 and 11. According to the fourth embodiment, in the communication network system shown in FIG. 1, the communication network system (the paging agent 4) transmits the identification information list 130 to each mobile terminal, corresponding to the interface of the wireless system held by each mobile terminal.

Figure 10:
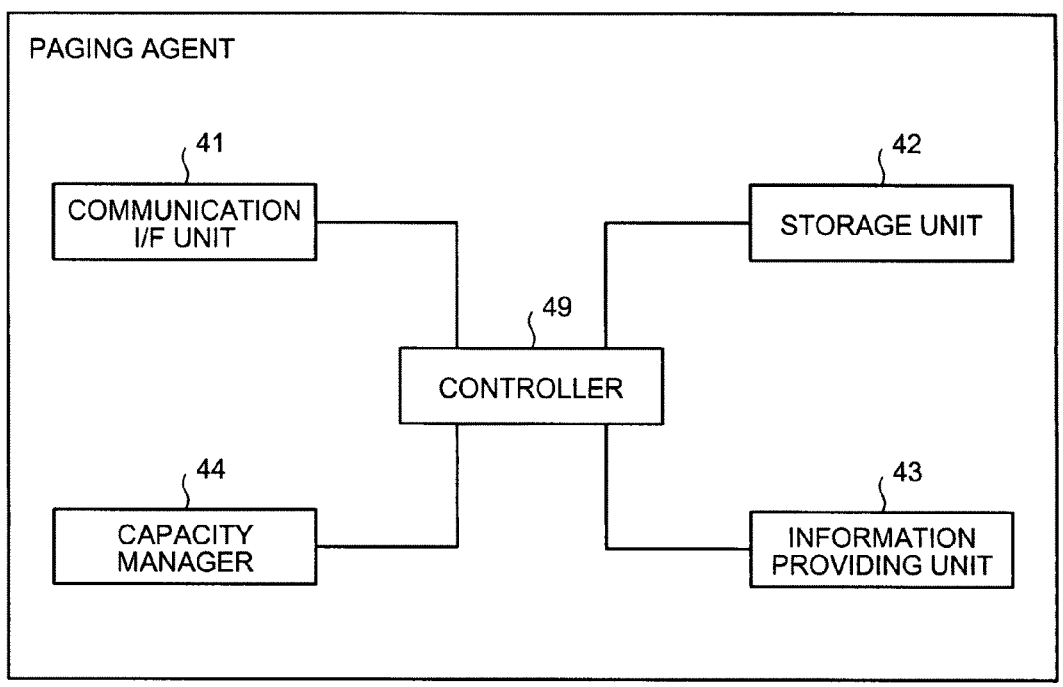
FIG. 10 is a block diagram of a configuration of a paging agent according to a fourth embodiment.

FIG. 10 is a block diagram of a configuration of a paging agent according to the fourth embodiment. Among the constituent elements shown in FIG. 10, elements that achieve the same functions as those of the paging agent 4 according to the second embodiment shown in FIG. 6 are denoted by like reference numerals, and redundant explanations thereof will be omitted. The paging agent 4 includes the communication I/F unit 41, the storage unit 42, the information providing unit 43, a capacity manager (terminal manager) 44, and the controller 49.

The capacity manager 44 checks the capacity (communication setting) of the mobile terminal 101. The capacity manager 44 changes the identification information list 130 based on a result of checking the capacity of the mobile terminal 101. The controller 49 controls the communication I/F unit 41, the storage unit 42, the information providing unit 43, and the capacity manager 44.

Figure 11:
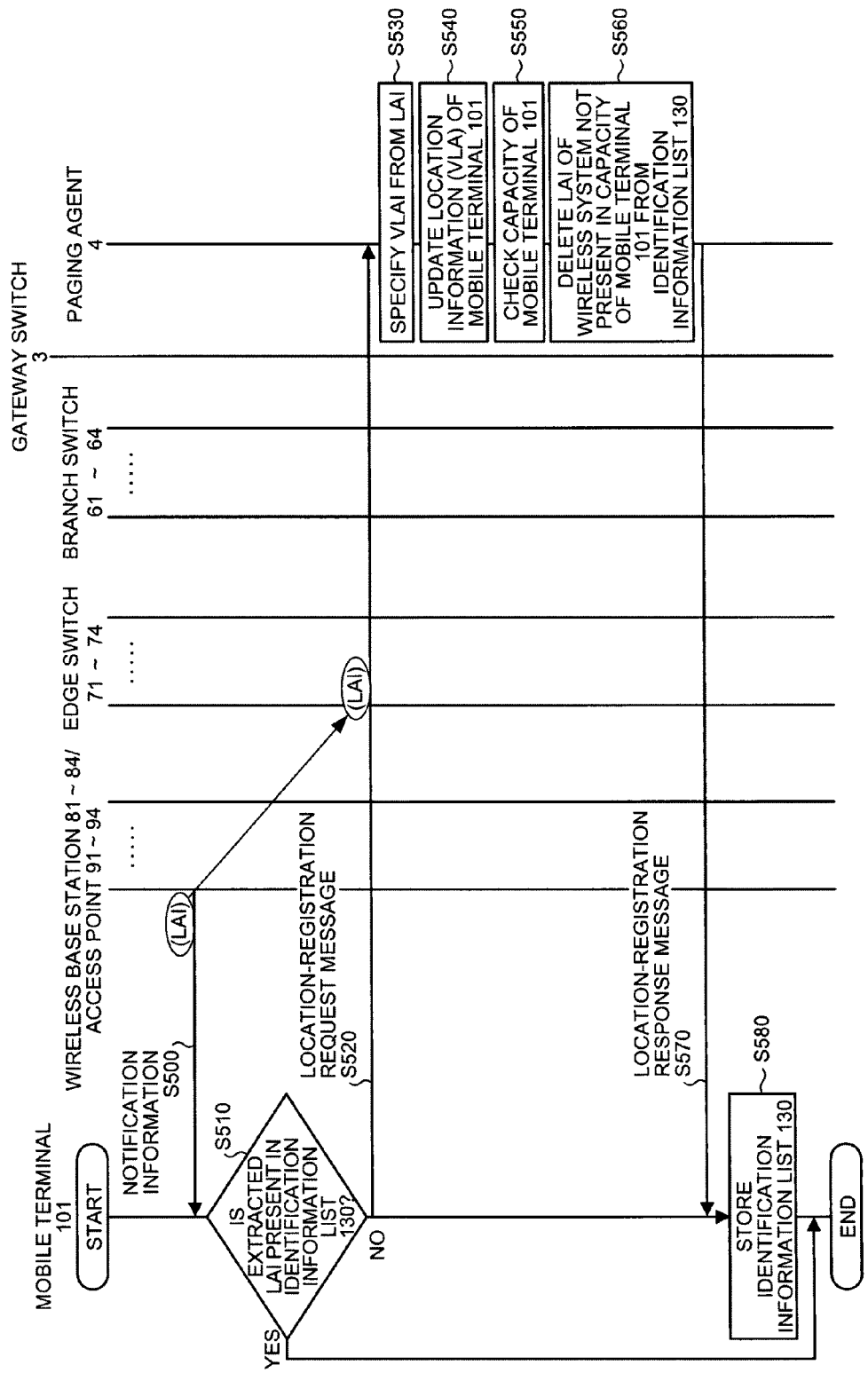
FIG. 11 depicts an operation procedure of a communication network system according to the fourth embodiment.

FIG. 11 depicts an operation procedure of the communication network system according to the fourth embodiment. The mobile terminal 101 in the waiting state receives notification information from the wireless system acquired by the mobile terminal 101 (step S500).

The change-information recognizing unit 16 of the mobile terminal 101 extracts the identifier (LAI) of the location registration area from the notification information, and determines whether the extracted LAI is present in the identification information list 130 stored in the storage unit 12 (step S510).

When the extracted LAI is not present in the identification information list 130 stored in the storage unit 12, the change-information recognizing unit 16 determines that the VLA has changed, and transmits a location-registration request message containing the extracted LAI to the paging agent 4 (step S520).

The information providing unit 43 of the paging agent 4 specifies the VLAI from the LAI contained in the transmitted location-registration request message (step S530), and updates the VLA of the mobile terminal 102 stored in the storage unit 42 (step S540).

The capacity manager 44 of the paging agent 4 checks the capacity of the mobile terminal 101 (step S550). The capacity manager 44 checks the number of wireless interfaces held by the mobile terminal 101 and the types of the wireless interfaces, thereby checking the capacity of the mobile terminal 101.

When plural heterogeneous wireless systems are provided within the communication network system, each mobile terminal does not necessarily hold interfaces of all the heterogeneous wireless systems. That is, the number and types of wireless interfaces that receive services are different for each mobile terminal. For example, the mobile terminal 101 includes the 3G and the 4G, and the mobile terminal 102 includes wireless interfaces of the 2G, 3G, and 4G. Information (the number and types of wireless interfaces) concerning the capacity of the mobile terminal 101 is added to the location-registration request message, and this message is transmitted from the mobile terminal 101 to the paging agent 4.

The capacity manager 44 of the paging agent 4 deletes the LAI of the wireless system which is not present in the capacity (setting) of the mobile terminal 101 from the identification information list 130 containing the VLA specified by the information providing unit 43 (step S560).

The information providing unit 43 of the paging agent 4 adds the identification information list 130 containing the specified VLA to the location-registration response message, and transmits this message to the mobile terminal 101 (step S570).

Upon receiving the location-registration response message from the paging agent 4, the mobile terminal 101 recognizes that the location registration has been completed. The identification-information extracting unit 13 of the mobile terminal 101 extracts the identification information list 130 from the location-registration response message, and stores the identification information list 130 into the storage unit 12 (step S580). Thereafter, the mobile terminal 101 moves while identifying the location registration areas between the overlaid wireless systems, following the procedure explained with reference to FIG. 3 in the first embodiment.

According to the fourth embodiment, the paging agent 4 transmits the identification information list 130 corresponding to the mobile terminal 101 to the mobile terminal 101. However, when plural mobile terminals are present, the identification information list 130 corresponding to each mobile terminal is transmitted to each mobile terminal.

As explained above, because the paging agent 4 includes the capacity manager 44, the identification information list 130 corresponding to the interface of the wireless system held by the mobile terminal 101 can be obtained (managed) within the communication network.

As explained above, according to the fourth embodiment, the communication network transmits to the mobile terminal 101 the identification information list 130 corresponding to the interface (communication setting) of the wireless system held by the mobile terminal 101. Therefore, the mobile terminal 101 can easily obtain the identification information list 130 corresponding to the interface of the wireless system held by the mobile terminal 101. As a result, a location registration area corresponding to the interface of the wireless system held by the mobile terminal 101 can be structured.

Fifth Embodiment

A fifth embodiment of the present invention is explained next with reference to FIGS. 12 and 13. According to the fifth embodiment, in the communication network system shown in FIG. 1, the mobile terminal determines a wireless terminal acquired corresponding to the status of load of each wireless system.

Figure 12:
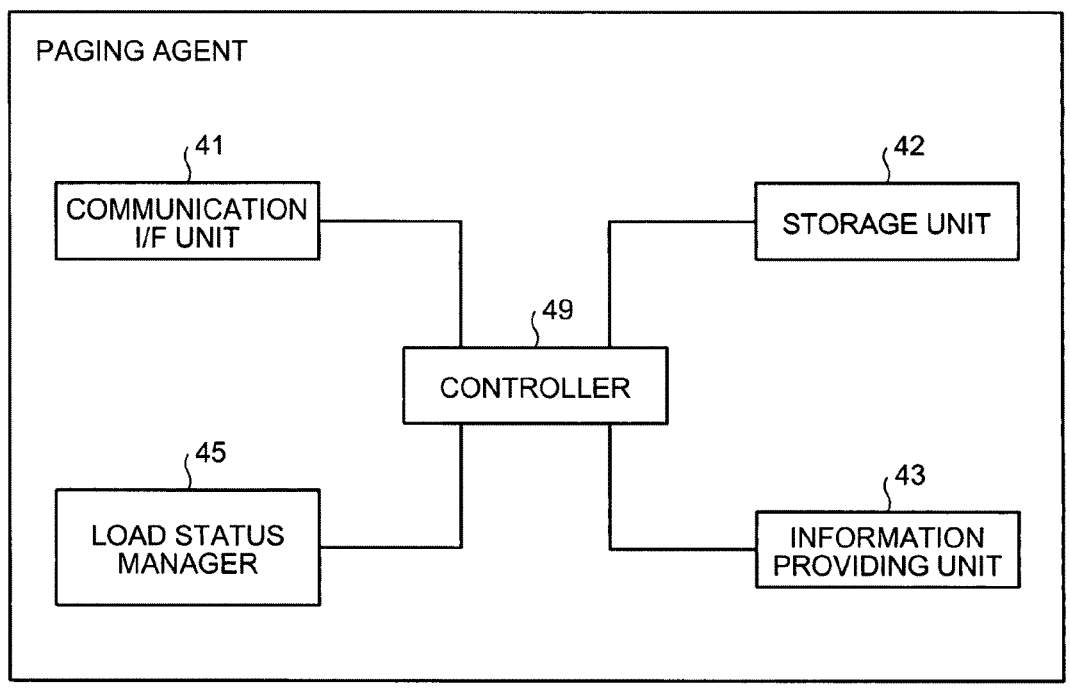
FIG. 12 is a block diagram of a configuration of a paging agent according to a fifth embodiment.

FIG. 12 is a block diagram of a configuration of a paging agent according to the fifth embodiment. Among the constituent elements shown in FIG. 12, elements that achieve the same functions as those of the paging agent 4 according to the second embodiment shown in FIG. 6 are denoted by like reference numerals, and redundant explanations thereof will be omitted. The paging agent 4 includes the communication I/F unit 41, the storage unit 42, the information providing unit 43, a load status manager (load manager) 45, and the controller 49.

The load status manager 45 checks the load status of each wireless system, and marks as load information the LAI of the wireless system having large load in the identification information list 130, to avoid the mobile terminal from being in the waiting state in the wireless system having the large load. The load status manager 45 adds the identification information list 130 containing the load information to the location-registration response message, and transmits this message to the mobile terminal 101 via the communication I/F unit 41. The controller 49 controls the communication I/F unit 41, the storage unit 42, the information providing unit 43, and the load status manager 45.

Figure 13:
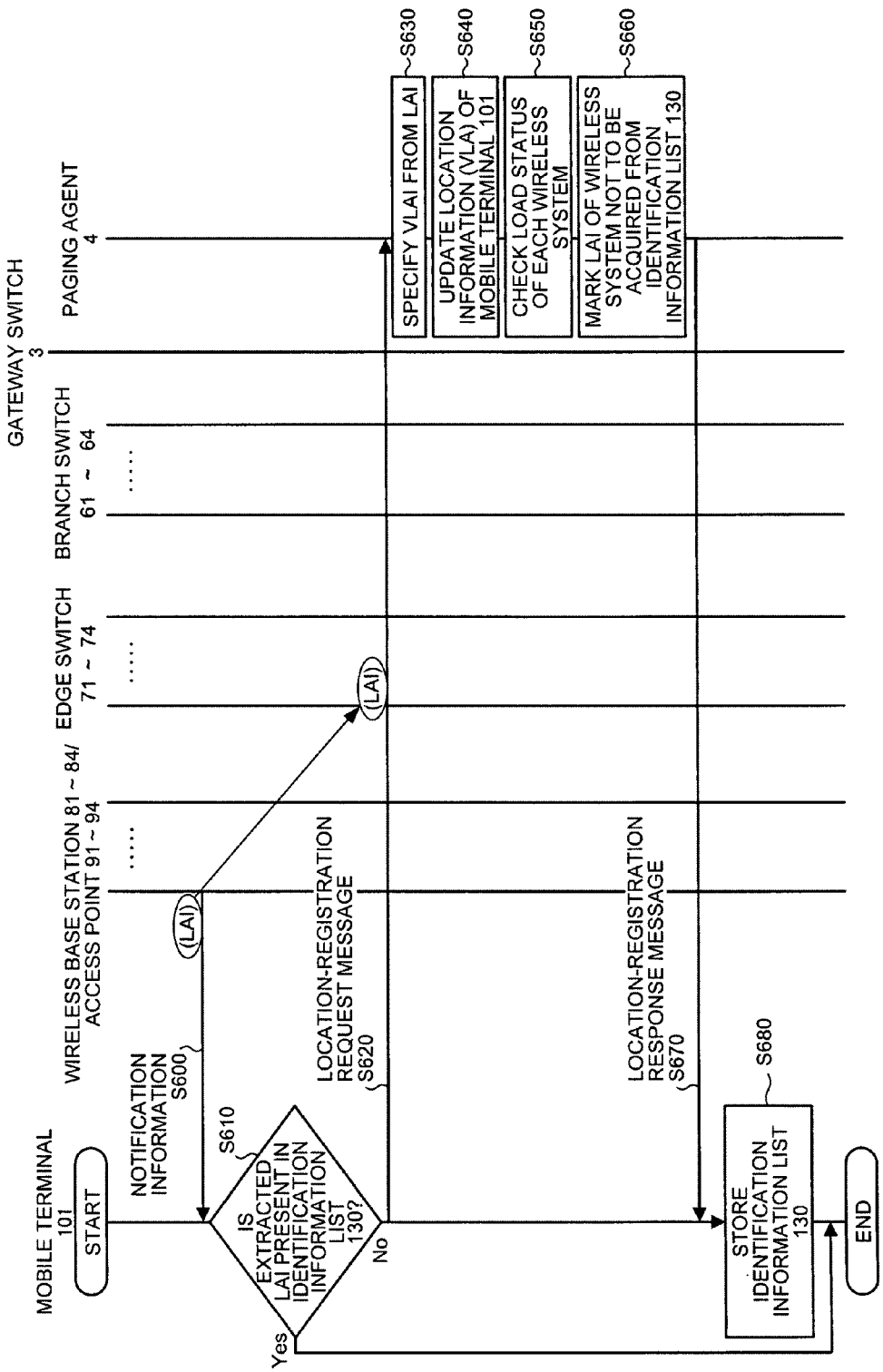
FIG. 13 depicts an operation procedure of a communication network system according to the fifth embodiment.

FIG. 13 depicts an operation procedure of the communication network system according to the fifth embodiment. The mobile terminal 101 in the waiting state receives notification information from the wireless system acquired by the mobile terminal 101 (step S600).

The change-information recognizing unit 16 of the mobile terminal 101 extracts the identifier (LAI) of the location registration area from the notification information, and determines whether the extracted LAI is present in the identification information list 130 stored in the storage unit 12 (step S610).

When the extracted LAI is not present in the identification information list 130 stored in the storage unit 12, the change-information recognizing unit 16 determines that the VLA has changed, and transmits a location-registration request message containing the extracted LAI to the paging agent 4 (step S620).

The information providing unit 43 of the paging agent 4 specifies the VLAI from the LAI contained in the transmitted location-registration request message (step S630), and updates the VLA of the mobile terminal 102 stored in the storage unit 42 (step S640).

The load status manager 45 of the paging agent 4 checks the load status of each wireless system (the wireless base stations 81 to 84, and the access points 91 to 94) (step S650). For example, the load status of each wireless system is notified from the wireless base stations 81 to 84 of the wireless systems and from the access points 91 to 94 to the paging agent 4, periodically or each time when the load status of the wireless system exceeds a predetermined threshold value.

Each of the edge switches 71 to 74 can also collect the load status of each wireless system (the wireless base stations 81 to 84, and the access points 91 to 94), and can notify the paging agent 4 about the load status each time when the paging agent 4 enquires the edge switches 71 to 74 about the load status.

Upon checking the load status of each wireless system, the load status manager 45 marks as load information the LAI of the wireless system having large load in the identification information list 130, to avoid the mobile terminal 101 from being in the waiting state in the wireless system having the large load (step S660). The load status manager 45 adds the identification information list 130 containing the marked LAI (load information) to the location-registration response message, and transmits this message to the mobile terminal 101 via the communication I/F unit 41 (step S670).

Upon receiving the location-registration response message from the paging agent 4, the mobile terminal 101 recognizes that the location registration has been completed. The identification-information extracting unit 13 of the mobile terminal 101 extracts the identification information list 130 from the location-registration response message, and stores the identification information list 130 into the storage unit 12 (step S680). Thereafter, the mobile terminal 101 moves while identifying the location registration areas between the overlaid wireless systems, following the procedure explained with reference to FIG. 3 in the first embodiment.

As explained above, because the paging agent 4 includes the load status manager 45, the identification information list 130 corresponding to the load status of the wireless system can be obtained within the communication network.

As explained above, according to the fifth embodiment, the communication network transmits to the mobile terminal 101 the identification information list 130 corresponding to the load status of the wireless system stored in the mobile terminal 101. Therefore, the mobile terminal 101 can easily obtain information concerning the load status of the wireless system. Because the mobile terminal 101 acquires only a predetermined wireless system based on the load status of the wireless system, the load of the wireless systems can be dispersed to avoid concentration of the location registration in a specific wireless system.

Sixth Embodiment

A sixth embodiment of the present invention is explained next with reference to FIGS. 14 and 15. According to the sixth embodiment, in the communication network system shown in FIG. 1, when the service area of the wireless system includes a service area of other wireless system, this wireless system is managed in the same location registration area, in an identification information list 131. The mobile terminal 101 according to the first embodiment shown in FIG. 3 stores the identification information list 131.

Figure 14:
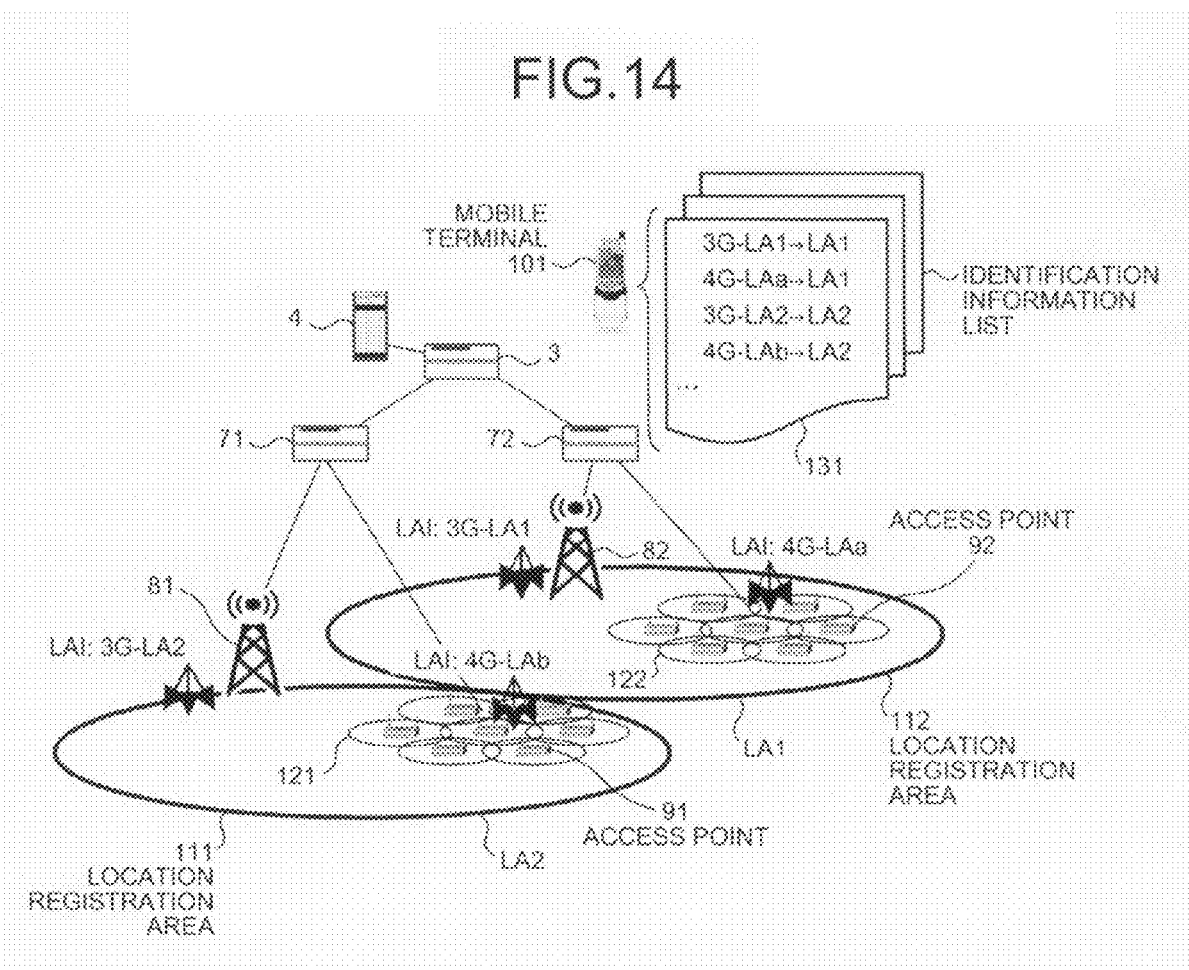
FIG. 14 is an explanatory diagram of a relationship between an LA and a VLA of a communication network system according to a sixth embodiment.
Figure 15:
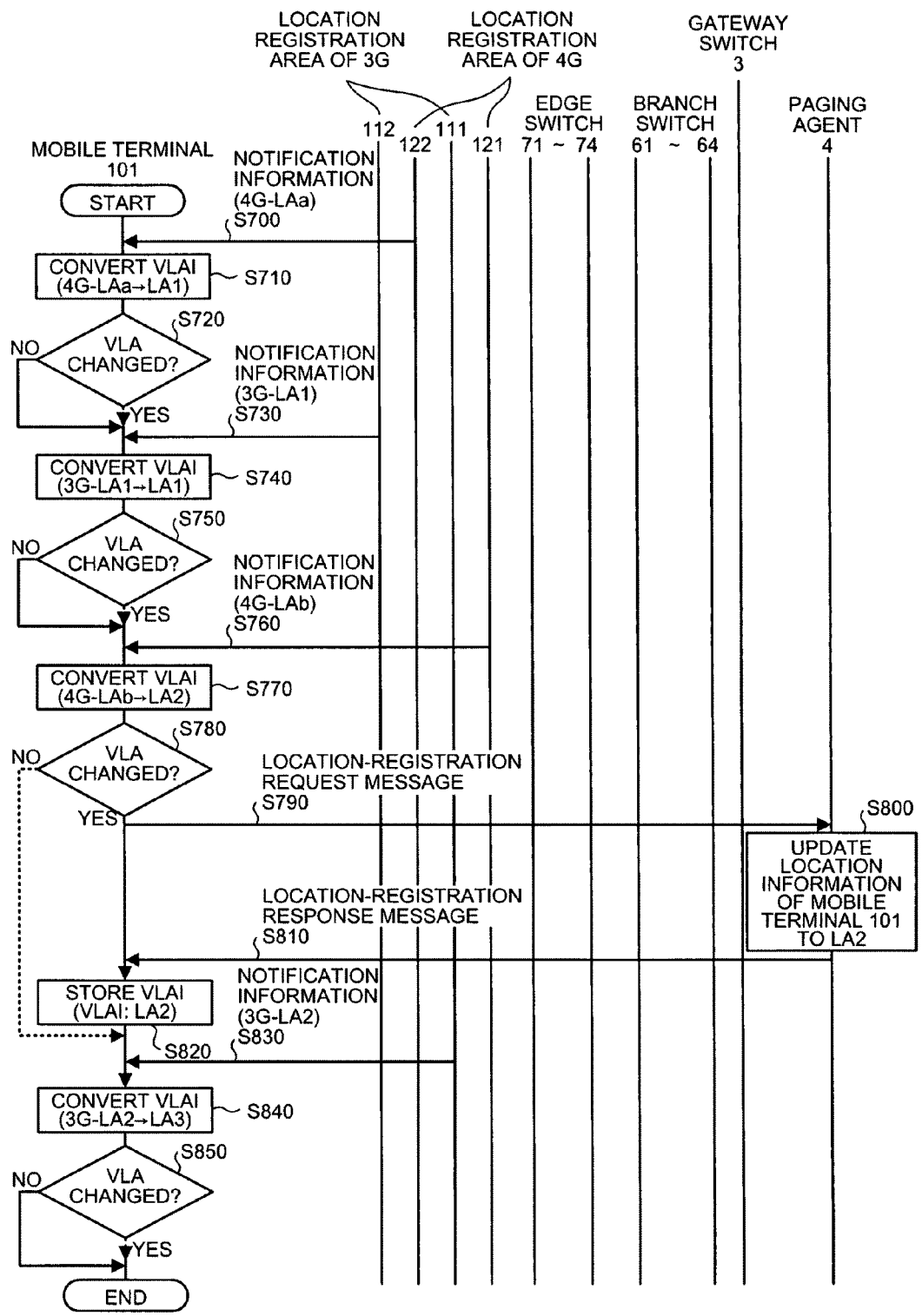
FIG. 15 depicts an operation procedure of a communication network system according to the sixth embodiment.

FIG. 14 is an explanatory diagram of a relationship between the LA and the VLA of the communication network system according to the sixth embodiment. Among the constituent elements shown in FIG. 14, elements that achieve the same functions as those of the communication network system according to the first embodiment shown in FIG. 2 are denoted by like reference numerals, and redundant explanations thereof will be omitted. FIG. 14 depicts the communication network system omitting the branch switches 61 to 64.

As location registration identifiers (LAI) specific to each wireless system, the LAI of the location registration area 111 of the wireless base station 81 is the identifier "LAI:3G-LA2", and the LAI of the location registration area 121 of the access point 91 is the identifier "LAI:4G-LAb".

The location registration area 121 of the access point 91 is included in the location registration area 111 of the wireless base station 81. Therefore, in the sixth embodiment, the VLAI of the location registration area 121 has the identifier "LA2", which is the same as the identifier of the VLAI of the location registration area 111.

Further, the LAI of the location registration area 112 of the wireless base station 82 is the identifier "LAI:3G-LA1", and the LAI of the location registration area 122 of the access point 92 is the identifier "LAI:4G-LAa".

The location registration area 122 of the access point 92 is included in the location registration area 112 of the wireless base station 82. Therefore, the VLAI of the location registration area 122 has the identifier "LA1" which is the same as the identifier of the VLAI of the location registration area 112.

That is, the "LAI:3G-LA2" of the location registration area 111 of the wireless base station 81 and the "LAI:4G-LAb" of the location registration area 121 of the access point 91 correspond to the VLAI (LA1).

Further, the "LAI:3G-LA1" of the location registration area 112 of the wireless base station 82 and the "LAI:4G-LAa" of the location registration area 122 of the access point 92 correspond to the VLAI (LA2). Each mobile terminal 101 (102) stores a correspondence table between the LAI and the VLAI as the identification information list 131.

An operation procedure of the communication network system according to the sixth embodiment is explained next. FIG. 15 depicts the operation procedure of the communication network system according to the sixth embodiment. As one example of a move of the mobile terminal 101, there is explained below the move of the mobile terminal 101 in the waiting state in the order of the location registration 122 area (LAI:4G-LAa) of the 4G, the location registration 112 area (LAI:3G-LA1) of the 3G, the location registration 121 area (LAI:4G-LAb) of the 4G, and the location registration 111 area (LAI:3G-LA2) of the 3G.

The mobile terminal 101 moves from the location registration area 122 to the location registration area 121 of 4G via the location registration area 112 of the 3G, in the process similar to that in the first embodiment shown in FIG. 4, and therefore explanations thereof will be omitted. Steps S700 to S820 shown in FIG. 15 correspond to steps S100 to S220 in FIG. 4.

After the mobile terminal 101 carries out the process at step S220, the mobile terminal 101 moves to the location registration area 111 of the 3G. The mobile terminal 101 receives notification information from the wireless base station 81 in the location registration area 111 of the 3G via the communication I/F unit 11 (step S830).

The identification-information extracting unit 13 of the mobile terminal 101 extracts the "LAI:3G-LA2" as the location registration identifier of the 3G from the received notification information. The identification-information comparing unit 14 of the mobile terminal 101 obtains the VLAI corresponding to the LAI extracted by the identification-information extracting unit 13, based on the identification information list 131 stored in the storage unit 12 (step S840). In this case, because the "LAI:3G-LA1" of the location registration area 111 corresponds to the VLAI (LA2) of the same location registration area 121 in the identification information list 131, the identification-information comparing unit 14 extracts the VLAI (LA2).

The identification-information comparing unit 14 of the mobile terminal 101 compares the VLAI extracted this time with the VLAI held by the identification-information comparing unit 14 (step S850). Because the VLAI (LA2) extracted this time has the same value as the VLAI (LA2) held by the identification-information comparing unit 14, the identification-information comparing unit 14 determines that there is no change in the VLA, and the mobile terminal 101 maintains the receiving state. The identification-information comparing unit 14 keeps holding the held VLAI (LA2). Thereafter, the paging agent 4 carries out the process similar to that explained in the first embodiment, thereby paging the mobile terminal 101.

As explained above, according to the sixth embodiment, when the service area of the wireless system includes a service area of other wireless system, this included service area is managed as the same location registration area as that of the wireless system that includes the wireless system. Therefore, the number of location registration signals transmitted and received between the mobile terminal 101 and the paging agent 4 can be decreased. Consequently, location registrations transmitted and received between the mobile terminal 101 and the paging agent 4 can be carried out efficiently.

Seventh Embodiment

A seventh embodiment of the present invention is explained next with reference to FIGS. 16 to 18. According to the seventh embodiment, in the communication network system shown in FIG. 1, when the service area of the wireless system includes a service area of other wireless system, this included service area is managed as the same location registration area as that of the wireless system which includes this wireless system. At the same time, a wireless system acquired by the mobile terminal is selected corresponding to the moving speed of the mobile terminal 101.

Figure 16:
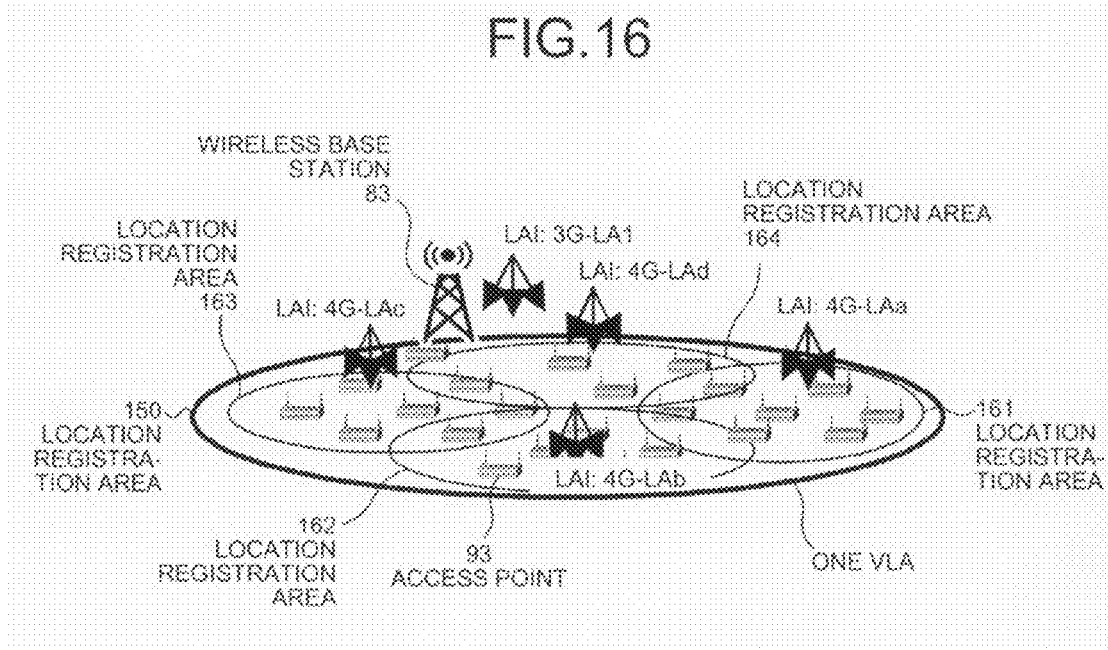
FIG. 16 is an explanatory diagram of a VLA of a communication network system according to a seventh embodiment.

FIG. 16 is an explanatory diagram of the VLA of the communication network system according to the seventh embodiment. Among the constituent elements shown in FIG. 16, elements that achieve the same functions as those of the communication network system according to the first embodiment shown in FIG. 2 are denoted by like reference numerals, and redundant explanations thereof will be is omitted.

A wireless base station 83 communicates with the mobile terminal 101 based on the third-generation (3G) mobile communication system within a location registration area 150. The location registration area 150 includes location registration areas 161 to 164 of access points 93.

The plural access points 93 within the location registration area 150 communicate with the mobile terminal 101 using the fourth-generation (4G) mobile communication system within the location registration areas 161 to 164, respectively.

According to the seventh embodiment, the location registration area (VLA) managed by the heterogeneous-wireless communication-integrated communication network system configures one VLA in the location registration area 150 and the location registration areas 161 to 164.

The LAI of the location registration area 150 is the identifier "LAI:3G-LAI", the LAIs of the location registration areas 161 to 164 are the identifiers "LAI:4G-LAa", "LAI:4G-LAb", "LAI:4G-LAc", and "LAI:4G-LAd", respectively.

Figure 17:
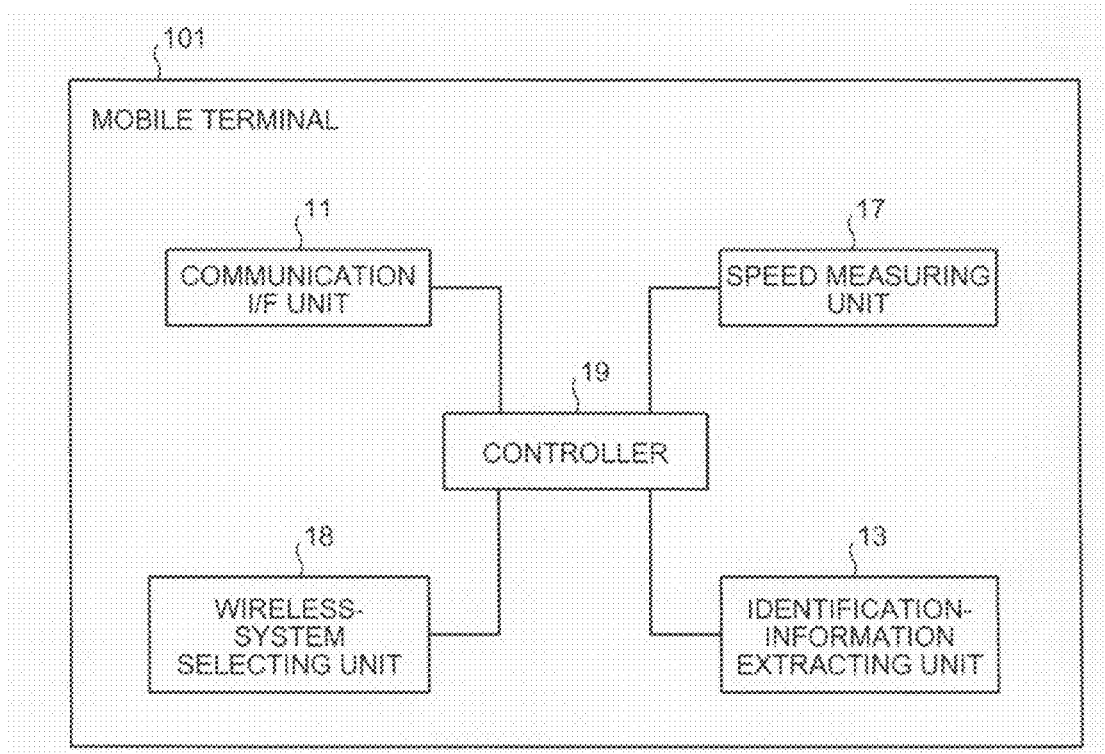
FIG. 17 is a block diagram of a mobile terminal according to the seventh embodiment.

FIG. 17 is a block diagram of the mobile terminal according to the seventh embodiment. Among the constituent elements shown in FIG. 17, elements that achieve the same functions as those of the mobile terminal 101 according to the first embodiment shown in FIG. 3 are denoted by like reference numerals, and redundant explanations thereof will be omitted. The mobile terminal 101 includes the communication I/F unit 11, the identification-information extracting unit 13, a speed measuring unit 17, a wireless-system selecting unit (first selecting unit and second selecting unit) 18, and the controller 19.

The speed measuring unit 17 detects a speed at which the mobile terminal 101 moves, thereby measuring the moving speed. The wireless-system selecting unit 18 selects the wireless system to be acquired, based on the moving speed of the mobile terminal 101 and the size of the cell radius of each wireless system. The controller 19 controls the communication I/F unit 11, the identification-information extracting unit 13, the speed measuring unit 17, and the wireless-system selecting unit 18.

Figure 18:
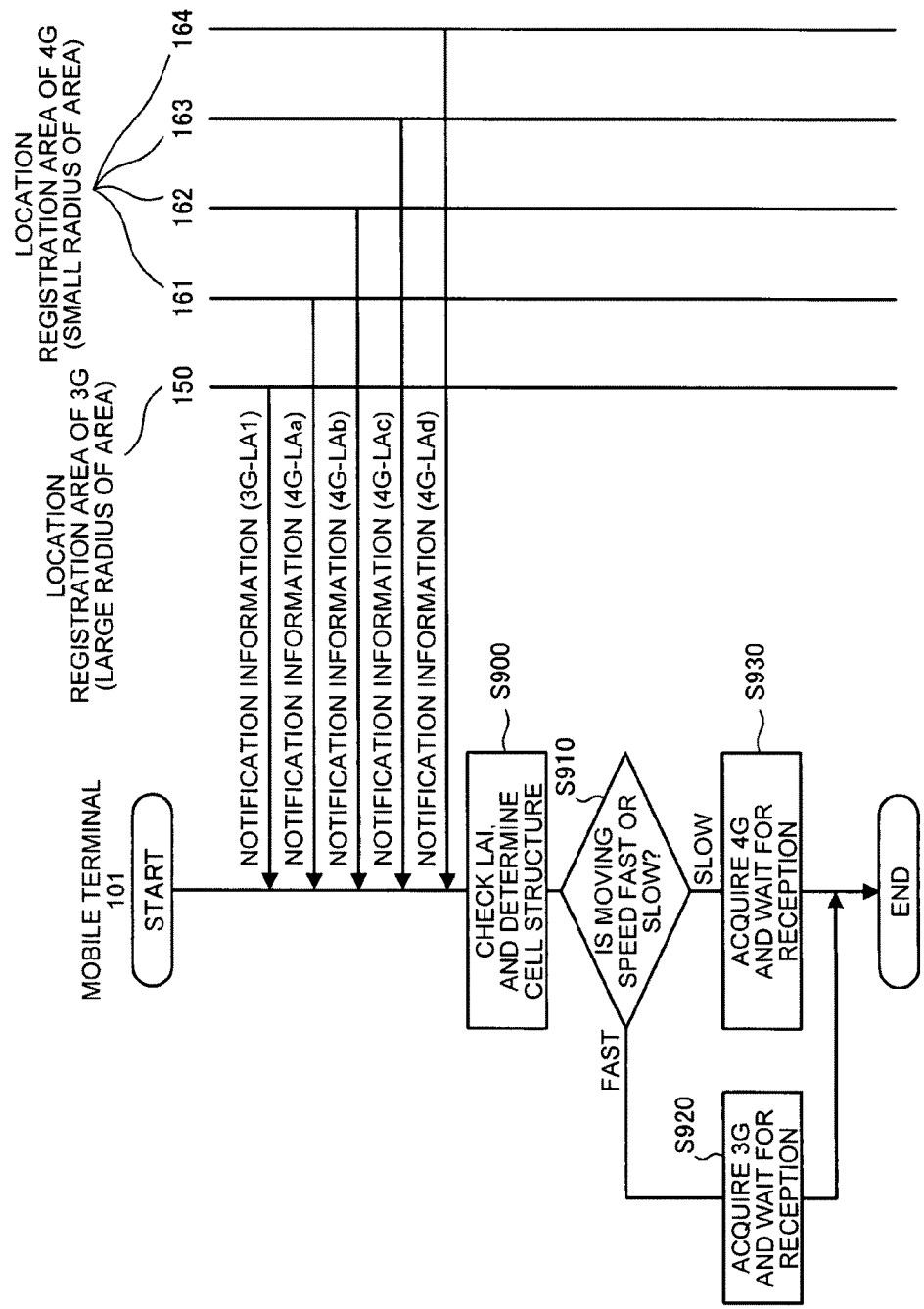
FIG. 18 depicts an operation procedure of a communication network system according to the seventh embodiment.

FIG. 18 depicts an operation procedure of the communication network system according to the seventh embodiment. The communication I/F unit 11 of the mobile terminal 101 in the waiting state receives notification information (3G-LAI) from the wireless base station 83 within the location registration area 150. When the communication I/F unit 11 of the mobile terminal 101 is located in the location registration area 161, the communication I/F unit 11 receives notification information (4G-LAa) from the access point 93 within the location registration area 161. When the communication I/F unit 11 of the mobile terminal 101 is located in the location registration area 162, the communication I/F unit 11 receives notification information (4G-LAb) from the access point 93 within the location registration area 162. When the communication I/F unit 11 of the mobile terminal 101 is located in the location registration area 163, the communication I/F unit 11 receives notification information (4G-LAc) from the access point 93 within the location registration area 163. When the communication I/F unit 11 of the mobile terminal 101 is located in the location registration area 164, the communication I/F unit 11 receives notification information (4G-LAc) from the access point 93 within the location registration area 164.

The identification-information extracting unit 13 extracts the LAI of each wireless system from the notification information received from the wireless base station 83 or the access point 93. The wireless-system selecting unit 18 of the mobile terminal 101 determines a size of the cell structure of the location registration area of each wireless system, based on the LAI extracted by the identification-information extracting unit 13.

For example, when the mobile terminal 101 is present in the location registration area 161, the mobile terminal 101 receives the notification information (4G-LAa) from the access point 93 within the location registration area 161 and the notification information (3G-LA1) from the radio base station 83 within the location registration area 150. In this case, the wireless-system selecting unit 18 compares the size of the cell structure of the location registration area 150 with the cell structure of the location registration area 161. The wireless-system selecting unit 18 determines that the cell structure (3G) of the location registration area 150 is larger than the cell structure (4G) of the location registration area 161 (step S900).

The speed measuring unit 17 of the mobile terminal 101 measures the moving speed. The wireless-system selecting unit 18 determines whether the moving speed measured by the speed measuring unit 17 is faster than a predetermined speed set in advance (step S910).

When it is determined that the moving speed is faster than the predetermined speed set in advance, the wireless-system selecting unit 18 selects the wireless system of the 3G (the wireless base station 83, the location registration area 150) having a large cell radius. The mobile terminal 101 acquires the wireless system of the 3G having the large cell radius selected by the wireless-system selecting unit 18, and becomes in the waiting state (step S920).

On the other hand, when it is determined that the moving speed is slower than the predetermined speed set in advance, the wireless-system selecting unit 18 selects the wireless system of the 4G (the access point 93, the location registration area 161) having a small cell radius. The mobile terminal 101 acquires the wireless system of the 4G having the small cell radius selected by the wireless-system selecting unit 18, and becomes in the waiting state (step S930). The mobile terminal 101 moves while identifying the location registration areas between the process-overlaid wireless systems, in the process explained with reference to FIG. 3 in the first embodiment.

As explained above, because the mobile terminal 101 includes the wireless-system selecting unit 18, the wireless-system selecting unit 18 can carry out the location registration corresponding to the moving speed, and can select the wireless system that becomes in the waiting state.

While the wireless systems explained are the 3G wireless system and the 4G wireless system in the seventh embodiment, the wireless systems are not limited to the 3G and the 4G, and can be the wireless LAN, the Bluetooth (the registered trademark), and the UWB (Ultra Wide Band). In this case, the wireless-system selecting unit 18 also selects the wireless system to be acquired corresponding to the cell radius of each wireless system.

As explained above, according to the seventh embodiment, the location registration is carried out corresponding to the moving speed, thereby selecting the wireless system that becomes in the waiting state. Therefore, location registration signals between the mobile terminal 101 and the wireless system can be decreased, and load can be dispersed to avoid concentration of the location registration in a specific wireless system.

Eighth Embodiment

An eighth embodiment of the present invention is explained next with reference to FIGS. 19 and 20. According to the eighth embodiment, in the communication network system shown in FIG. 1, when the service area of the wireless system includes a service area of other wireless system, this included service area is managed as the same location registration area as that of the wireless system which includes this wireless system. At the same time, a wireless system acquired by the mobile terminal 101 is selected depending on presence of a band that the application used by the mobile terminal 101 requires. The mobile terminal 101 selects the wireless system to be acquired within the communication network system according to the seventh embodiment shown in FIG. 16.

Figure 19:
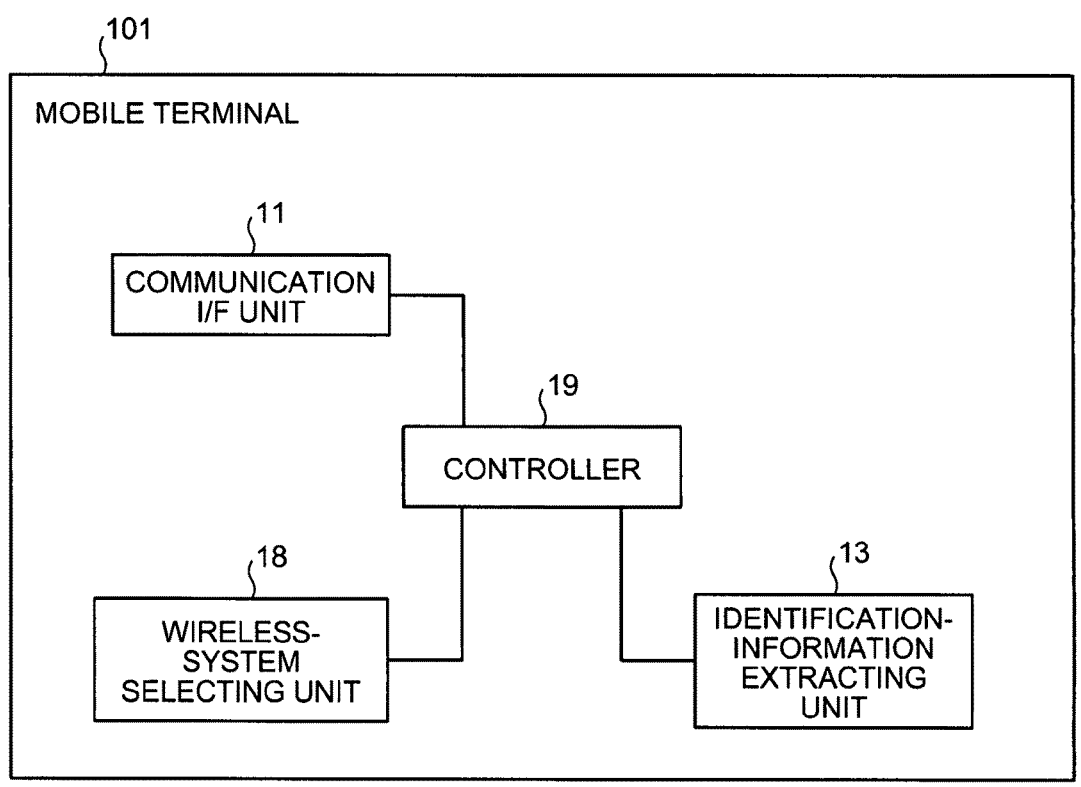
FIG. 19 is a block diagram of a mobile terminal according to an eighth embodiment.

FIG. 19 is a block diagram of the mobile terminal according to the eighth embodiment. Among the constituent elements shown in FIG. 19, elements that achieve the same functions as those of the mobile terminal 101 according to the first and seventh embodiments shown in FIGS. 3 and 17 are denoted by like reference numerals, and redundant explanations thereof will be omitted. The mobile terminal 101 includes the communication I/F unit 11, the identification-information extracting unit 13, the wireless-system selecting unit 18, and the controller 19.

The wireless-system selecting unit 18 selects the wireless system to be acquired based on the band required by the application used by the mobile terminal 101 and the band provided by each cell of the location registration area of each wireless system. The controller 19 controls the communication I/F unit 11, the identification-information extracting unit 13, and the wireless-system selecting unit 18.

FIG. 20 depicts an operation procedure of the communication network system according to the eighth embodiment. In the same operation procedure as that of the communication network system according to the seventh embodiment explained with reference to FIG. 18, the communication I/F unit 11 of the mobile terminal 101 in the waiting state receives the notification information (3G-LAI) from the wireless base station 83 within the location registration area 150. The mobile terminal 101 receives the notification information (4G-LAa), (4G-LAb), (4G-LAc), and (4G-LAd) from the access points 93 within the location registration areas 161 to 164, respectively.

For example, when the mobile terminal 101 is located in the location registration area 161, the mobile terminal 101 receives the notification information (4G-LAa) from the access point 93 within the location registration area 161, and the notification information (3G-LA1) from the radio base station 83 within the location registration area 150. The identification-information extracting unit 13 extracts the LAI of each wireless system from the notification information received from the wireless base station 83 or the access point 93.

The wireless-system selecting unit 18 of the mobile terminal 101 determines a value of the band provided by the cell of the location registration area of the wireless system corresponding to the LAI extracted by the identification-information extracting unit 13 (step S1000). The wireless-system selecting unit 18 of the mobile terminal 101 determines presence of the band required by the application which the mobile terminal 101 is waiting for (step S1010).

The wireless-system selecting unit 18 of the mobile terminal 101 selects the wireless system (the wireless base station 83, the location registration area 150) of a narrowband (small band), when the mobile terminal 101 is waiting for the arrival of a signal in the application which does not require a band. The mobile terminal 101 acquires the 3G of the narrowband selected by the wireless-system selecting unit 18 (step S1020).

On the other hand, the wireless-system selecting unit 18 of the mobile terminal 101 selects the wireless system (the access point 93, the location registration area 161, etc.) of a broadband (large band), when the mobile terminal 101 is waiting for the arrival of a signal in the application which requires a band. The mobile terminal 101 acquires the 4G of the narrowband selected by the wireless-system selecting unit 18 (step S1030). The mobile terminal 101 moves while identifying the location registration areas between the process-overlaid wireless systems, in the process explained with reference to FIG. 3 in the first embodiment.

As explained above, because the mobile terminal 101 includes the wireless-system selecting unit 18, the wireless-system selecting unit 18 can carry out the location registration corresponding to the band required by the application, and can select the wireless system that becomes in the waiting state.

As explained above, according to the eighth embodiment, the location registration is carried out corresponding to the band required by the application, thereby selecting the wireless system that becomes in the waiting state. Therefore, location registration signals between the mobile terminal 101 and the wireless system can be decreased, and communications can be carried out in the wireless system corresponding to the band required by the application at the signal arrival time.

INDUSTRIAL APPLICABILITY

The communication network system and the mobile terminal according to the present invention are suitable for a location registration of a mobile terminal in heterogeneous wireless access systems.

The invention claimed is:

1. A communication network system comprising:
   a plurality of heterogeneous wireless communication systems;
   a mobile terminal that communicates with the wireless communication systems; and
   a location registering device that registers a location of the mobile terminal, wherein
   the mobile terminal includes
      an identification-information extracting unit that extracts first identification information specific to a location registration area of each of the wireless communication systems from information received from each of the wireless communication systems,
      a first storage unit that stores therein correspondence information concerning a correspondence relationship between the first identification information and second identification information of a location registration area managed by the communication network system, and
      a location-registration requesting unit that extracts the second identification information corresponding to the first identification information based on the first identification information extracted by the identification-information extracting unit and the correspondence information stored in the first storage unit, and transmits location-registration request information for requesting the location registering device to perform a new location registration when the second identification information is updated by a movement of the mobile terminal.

2. The communication network system according to claim 1, wherein
   the location registering device includes a second storage unit that stores therein the correspondence information,
   the mobile terminal further includes a correspondence-information obtaining unit that requests the location registering device for the correspondence information to obtain the correspondence information, and
   the first storage unit stores therein the correspondence information obtained by the correspondence-information obtaining unit.

3. The communication network system according to claim 2, wherein upon receiving instruction information from the location registering device to obtain new correspondence information, the correspondence-information obtaining unit requests the location registering device for the correspondence information to obtain the new correspondence information.

4. The communication network system according to claim 2, wherein when the correspondence information stored in the first storage unit does not contain the first identification information received from each of the wireless communication systems, the correspondence-information obtaining unit requests the location registering device for the correspondence information to obtain new correspondence information.

5. The communication network system according to claim 2, wherein
   the location registering device further includes a terminal managing unit that manages terminal setting information concerning a setting of a communication for each mobile terminal, and
   upon receiving a request for the correspondence information from a mobile terminal, the terminal managing unit generates new correspondence information for each mobile terminal based on the terminal setting information, and transmits the new correspondence information to the mobile terminal from which the request for the correspondence information is received.

6. The communication network system according to claim 5, wherein the terminal managing unit manages the terminal setting information based on number and type of wireless interfaces of the wireless communication systems.

7. The communication network system according to claim 2, wherein
   the location registering device further includes a load managing unit that manages load status information concerning a load status for each of the wireless communication systems, and
   upon receiving a request for the correspondence information from a mobile terminal, the load managing unit generates new correspondence information for each mobile terminal based on the load status information, and transmits the new correspondence information to the mobile terminal from which the request for the correspondence information is received.

8. The communication network system according to claim 1, wherein the correspondence information is such that when a first service area of a first wireless communication system includes a second service area of a second wireless communication system, the second identification information of the second wireless communication system is same as the second identification information of the first wireless communication system.

9. The communication network system according to claim 8, wherein the mobile terminal further includes
   a speed measuring unit that measures a speed of movement of the mobile terminal, and
   a selecting unit that selects a wireless communication system based on a result of measurement by the speed measuring unit.

10. The communication network system according to claim 9, wherein when the speed of movement is faster than a predetermined speed, the selecting unit selects a wireless communication system having a broad service area from among the wireless communication systems.

11. The communication network system according to claim 8, wherein the mobile terminal further includes a selecting unit that selects a wireless communication system based on a status of a band required by an application that in a waiting mode.

12. The communication network system according to claim 11, wherein when the application in the waiting mode requires the band, the selecting unit selects a wireless communication system having a broadband from among the wireless communication systems.

13. A mobile terminal that communicates with a plurality of heterogeneous wireless communication systems, and that moves while performing a location registration within a communication network system having the wireless communication systems, the mobile terminal comprising:
an identification-information extracting unit that extracts first identification information specific to a location registration area of each of the wireless communication systems from information received from each of the wireless communication systems;
a first storage unit that stores therein correspondence information concerning a correspondence relationship between the first identification information and second identification information of a location registration area managed by the communication network system; and
a location-registration requesting unit that extracts the second identification information corresponding to the first identification information based on the first identification information extracted by the identification-information extracting unit and the correspondence information stored in the first storage unit, and transmits location-registration request information for requesting the location registering device to perform a new location registration when the second identification information is updated by a movement of the mobile terminal.

14. A method of registering a location of a mobile terminal in a wireless communication system including a mobile terminal, a base station, and a controller that performs a location registering process of registering the location of the mobile terminal that communicates with the base station, the method comprising:
first notifying including the base station notifying area identification information unique to a location registration area corresponding to the base station to the mobile terminal;
receiving including the mobile terminal notified at the first notifying;
comparing including the mobile terminal comparing the area identification information received at the receiving and registration-area identification information registered in the mobile terminal with each other;
second notifying including the mobile terminal notifying the area identification information and mobile-terminal identification information unique to the mobile terminal to the controller via the base station on whether the area identification information is register as the registration-area identification information as a result of comparison at the comparing;
third notifying including the controller notifying second area identification information associated with the area identification information to the mobile terminal corresponding to the mobile-terminal identification information based on the area identification information and the mobile-terminal identification information notified at the second notifying; and
registering including the mobile terminal registering the second area identification information notified at the third notifying as the registration-area identification information of the mobile terminal.

15. The method according to claim 14, wherein a service target area of the wireless communication system includes a plurality of location registration areas.

16. The method according to claim 14, wherein the second area identification information includes a plurality of pieces of area identification information corresponding to a plurality of location registration areas.

17. The method according to claim 14, wherein when the area identification information received by the mobile terminal is not registered in the mobile terminal as the registration-area identification information, the second notifying includes the mobile terminal notifying the area identification information and the mobile-terminal identification information to the controller.

18. A wireless communication system including a mobile terminal, a base station, and a controller that performs a location registering process of registering the location of the mobile terminal that communicates with the base station; wherein
the base station notifies area identification information unique to a location registration area corresponding to the base station to the mobile terminal,
the mobile terminal receives the area identification information notified by the base station, compares received area identification information with registration-area identification information registered in the mobile terminal, and notifies the area identification information and mobile-terminal identification information unique to the mobile terminal to the controller via the base station based on whether the area identification information is registered as the registration-area identification information as a result of comparison,
the controller notifies a second area identification information associated with the area identification information to the mobile terminal corresponding to the mobile-terminal identification information based on the area identification information and the mobile-terminal identification information notified by the mobile terminal, and
the mobile terminal registers the second area identification information notified by the controller as the registration-area identification information of the mobile terminal.

19. A mobile terminal in a wireless communication system that includes a mobile terminal, a base station, and a controller that performs a location registering process of registering the location of the mobile terminal that communicates with the base station, wherein
the mobile terminal receives area identification information unique to a location registration area corresponding to the base station from the base station, compares received area identification information with registration-area identification information registered in the mobile terminal, notifies the area identification information and mobile-terminal identification information unique to the mobile terminal to the controller via the base station based on whether the area identification information is registered as the registration-area identification information as a result of comparison, and registers second area identification information associated with the area identification information notified by the controller based on the notified area identification information and mobile-terminal identification information as the registration-area identification information of the mobile terminal.

20. A location registration method employed in a radio communication system having a controller registering a location of a mobile terminal communicating with a base station, the location registration method comprising:

an information step of, at the base station, informing the mobile terminal of a location registration identifier specific to an area corresponding thereto;

a determination step of, at the mobile terminal, receiving the location registration identifier and determining whether the received location registration identifier is present in a first identification information list, which stores therein the location registration identifier in advance;

a first transmission step of, at the mobile terminal, transmitting a location-registration request message to the controller by way of the base station, when determining that the received location registration identifier is not present in the first identification information list at the determination step;

a second transmission step of, at the controller, transmitting a second identification information list to the mobile terminal as a location-registration response message; and an update step of, at the mobile terminal, storing the second identification information transmitted from the controller.

21. The location registration method according to claim 20, wherein the second identification information list is updated by the controller based on the location-registration request message.

22. The location registration method according to claim 20, wherein the second identification information list is added to the location-registration response message and transmitted to the mobile terminal.

23. The location registration method according to claim 20, wherein
the first identification information list is deleted when the second identification information list is stored in the mobile terminal.

24. The location registration method according to claim 20, wherein
the controller is a paging agent.

* * * * *